United States Patent
Kaji et al.

(10) Patent No.: US 9,906,130 B2
(45) Date of Patent: Feb. 27, 2018

(54) ELECTRICAL SOURCE SYSTEM

(71) Applicant: TOYOTA JIDOSHA KABUSHIKI KAISHA, Toyota-shi, Aichi-ken (JP)

(72) Inventors: Masaya Kaji, Toyota (JP); Shuji Tomura, Nagakute (JP); Masanori Ishigaki, Nagakute (JP); Naoki Yanagizawa, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/126,712

(22) PCT Filed: Feb. 10, 2015

(86) PCT No.: PCT/JP2015/054189
§ 371 (c)(1),
(2) Date: Sep. 16, 2016

(87) PCT Pub. No.: WO2015/141348
PCT Pub. Date: Sep. 24, 2015

(65) Prior Publication Data
US 2017/0117804 A1    Apr. 27, 2017

(30) Foreign Application Priority Data

Mar. 18, 2014 (JP) ................................. 2014-055379

(51) Int. Cl.
*H02M 3/158* (2006.01)
*H02M 7/44* (2006.01)
*B60L 11/00* (2006.01)

(52) U.S. Cl.
CPC ............. *H02M 3/158* (2013.01); *H02M 7/44* (2013.01); *B60L 11/005* (2013.01);
(Continued)

(58) Field of Classification Search
CPC . H02M 2001/0067; H02M 2001/0083; H02M 3/158; H02M 7/44; H02M 7/537;
(Continued)

(56) References Cited

U.S. PATENT DOCUMENTS 9,484,826 B2 * 11/2016 Lin .................... H02M 3/33546
2008/0136260 A1 * 6/2008 Watanabe ............. H02M 3/158
307/18

(Continued)

FOREIGN PATENT DOCUMENTS

DE    102013005070 A1 *  9/2014  ............ H02M 3/158
JP    2010-166790 A      7/2010
(Continued)

*Primary Examiner* — Fred E Finch, III
(74) *Attorney, Agent, or Firm* — Andrews Kurth Kenyon LLP

(57) ABSTRACT

An electrical source system has an electrical power converter which has a plurality of switching elements and performs an electrical power conversion with first and second electricity storage apparatus; and a control apparatus which controls an operation of the electrical power converter, when the electrical power converter performs the electrical power conversion with one electricity storage apparatus, the control apparatus controls the electrical power converter to change a switching state of one of two switching elements while keeping a switching state of the other one of the two switching elements in an ON state, each of two switching elements constitutes predetermined arm element whose switching state should be changed to perform the electrical power conversion with the one electricity storage apparatus.

3 Claims, 16 Drawing Sheets

(52) U.S. Cl.
CPC ....... *B60L 2210/10* (2013.01); *B60L 2210/14* (2013.01); *B60L 2210/44* (2013.01); *B60Y 2400/112* (2013.01); *B60Y 2400/114* (2013.01)

(58) Field of Classification Search
CPC .......... H02M 7/66; H02M 7/797; H02J 1/102; B60L 2210/10; B60L 2210/14; B60Y 2400/112; B60Y 2400/114
See application file for complete search history.

(56) References Cited

U.S. PATENT DOCUMENTS

| | | | |
|---|---|---|---|
| 2012/0043818 A1* | 2/2012 | Stratakos | H02J 3/383 307/77 |
| 2013/0134786 A1* | 5/2013 | Ishigaki | H02M 3/158 307/71 |
| 2014/0145694 A1 | 5/2014 | Ishigaki et al. | |
| 2014/0265605 A1* | 9/2014 | Ishigaki | H02M 3/158 307/80 |
| 2015/0084422 A1* | 3/2015 | Ishigaki | H01F 27/38 307/43 |

FOREIGN PATENT DOCUMENTS

| | | | | |
|---|---|---|---|---|
| JP | 2013-013234 A | 1/2013 | | |
| JP | 2013013233 A | 1/2013 | | |
| WO | 2015/011879 A1 | 1/2015 | | |
| WO | WO 2015164970 A1 * | 11/2015 | ............. | H02M 1/15 |

\* cited by examiner

[FIG. 1]
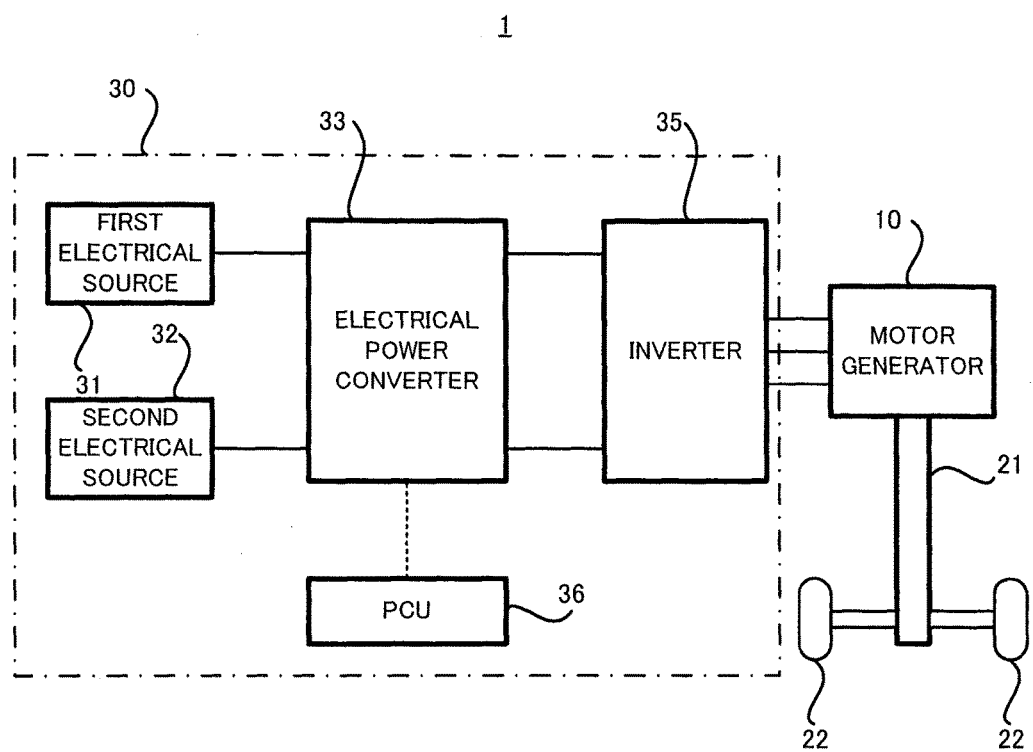

[FIG. 2]
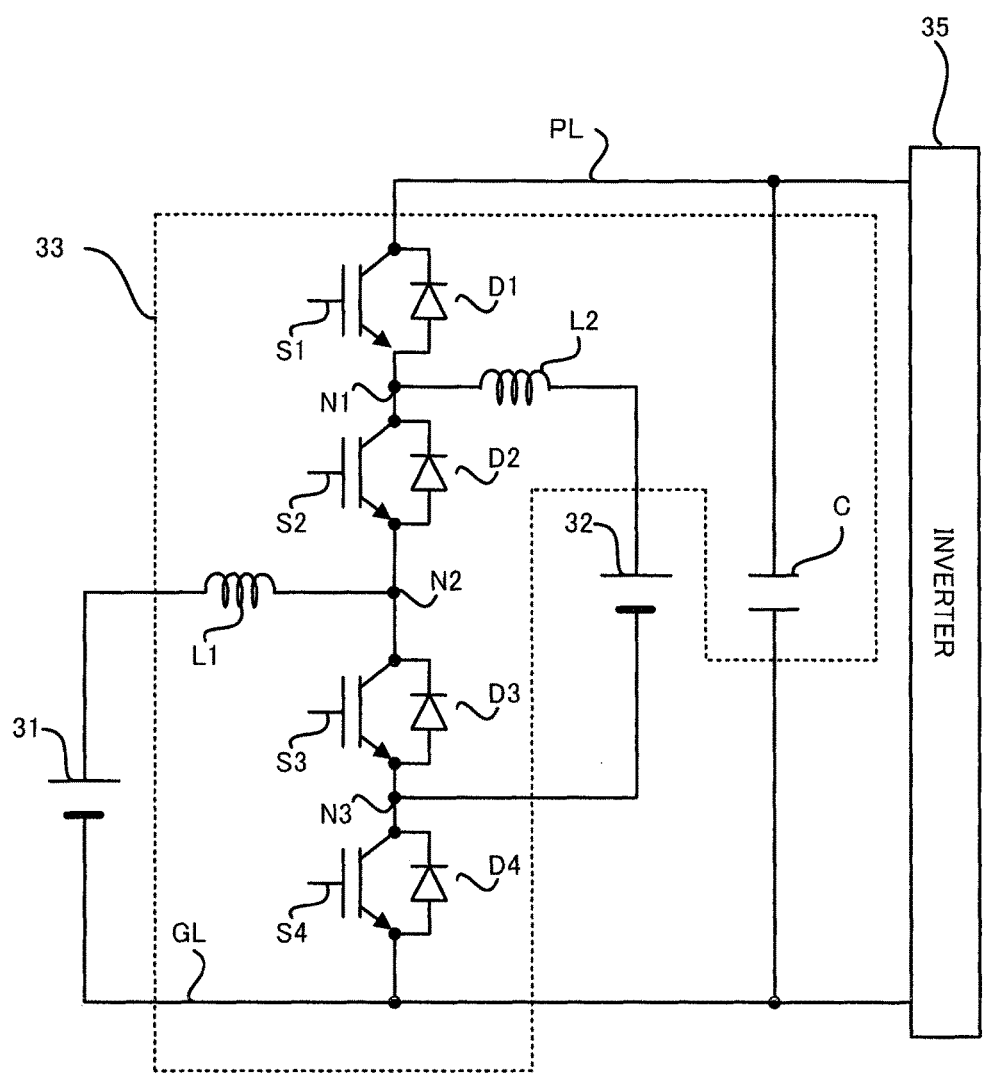

[FIG. 3]
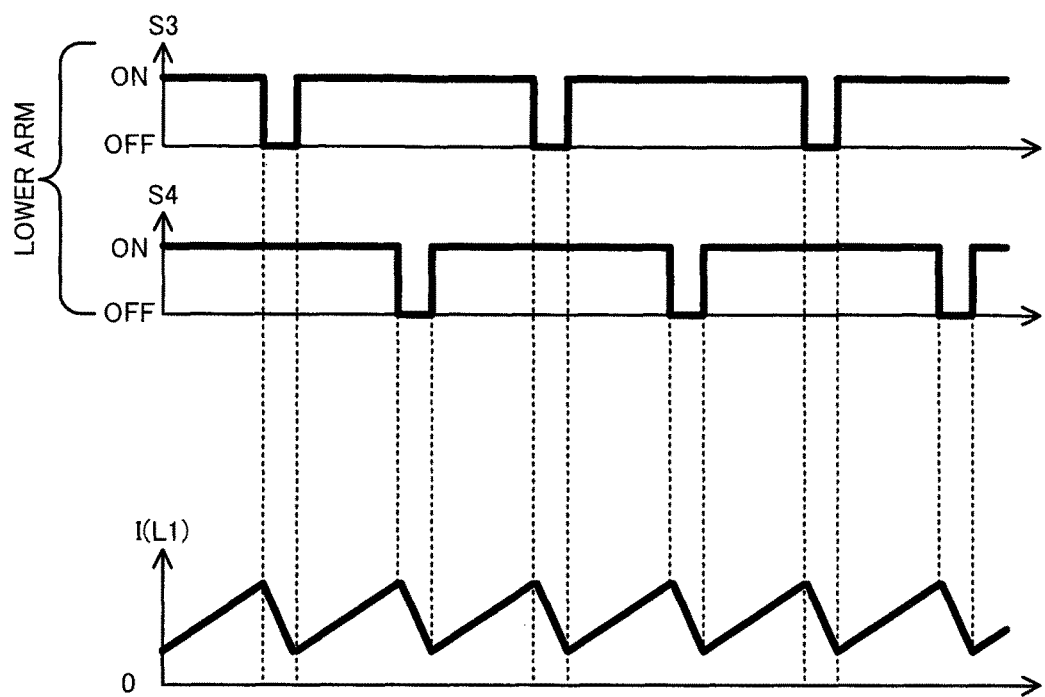

[FIG. 4]
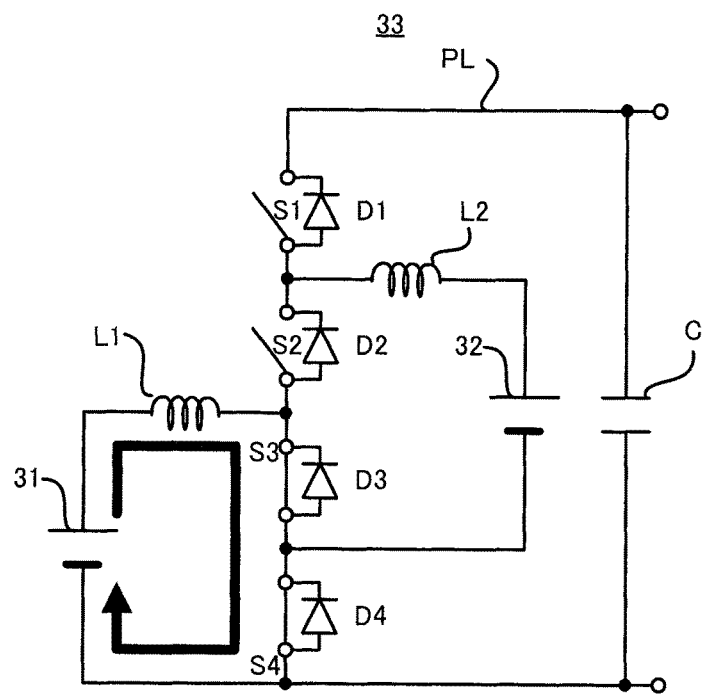
(a)
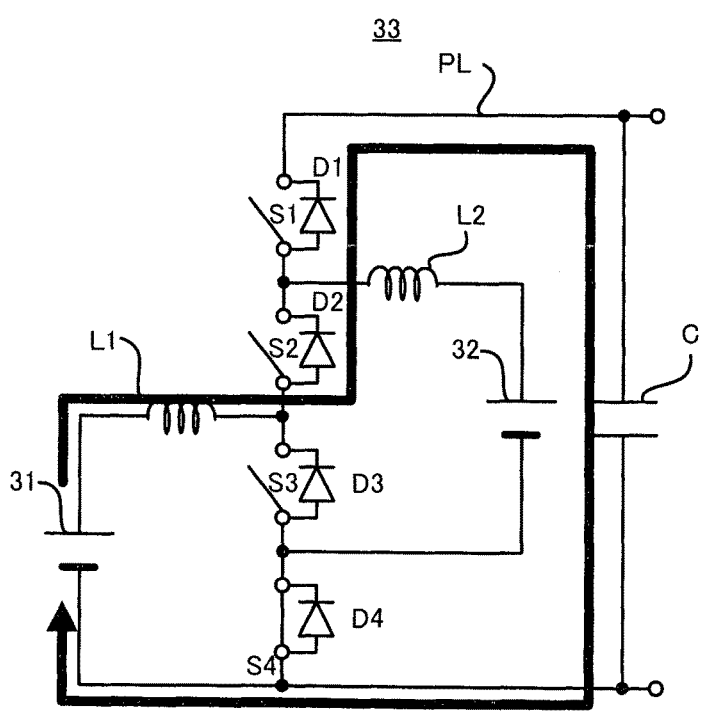
(b)

[FIG. 5]
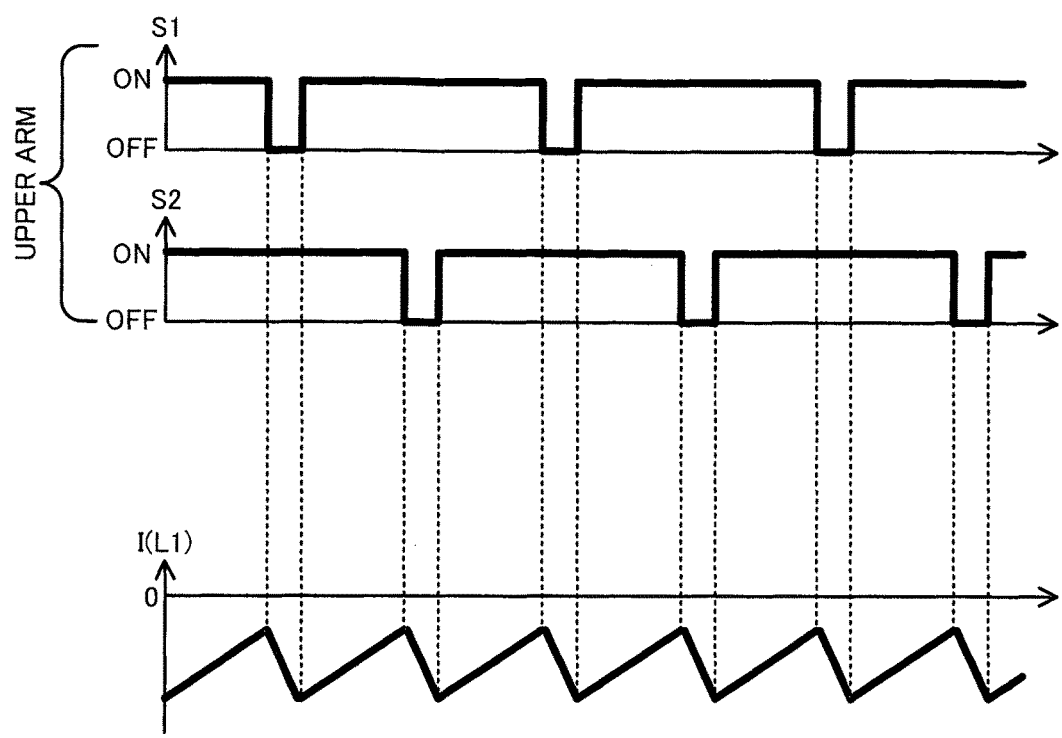

[FIG. 6]
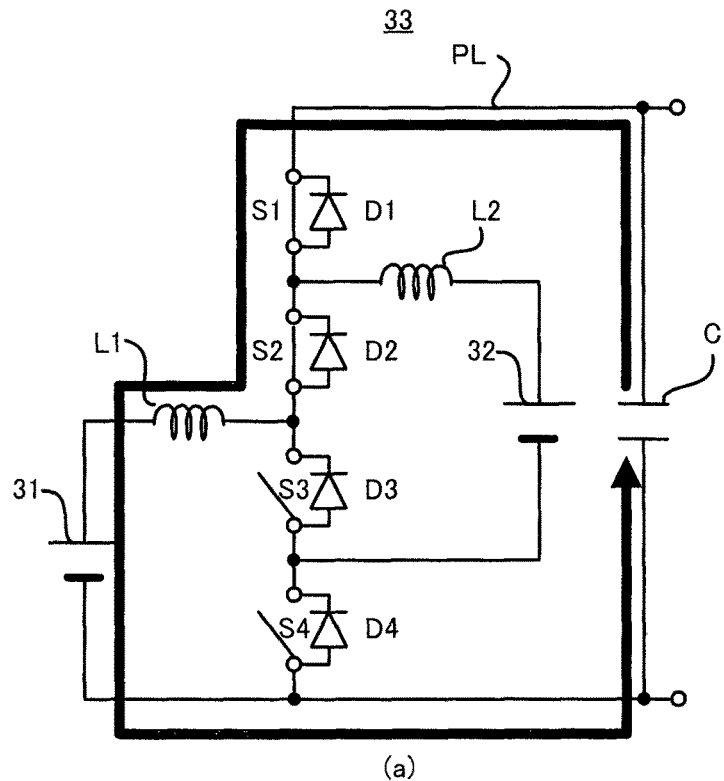
(a)
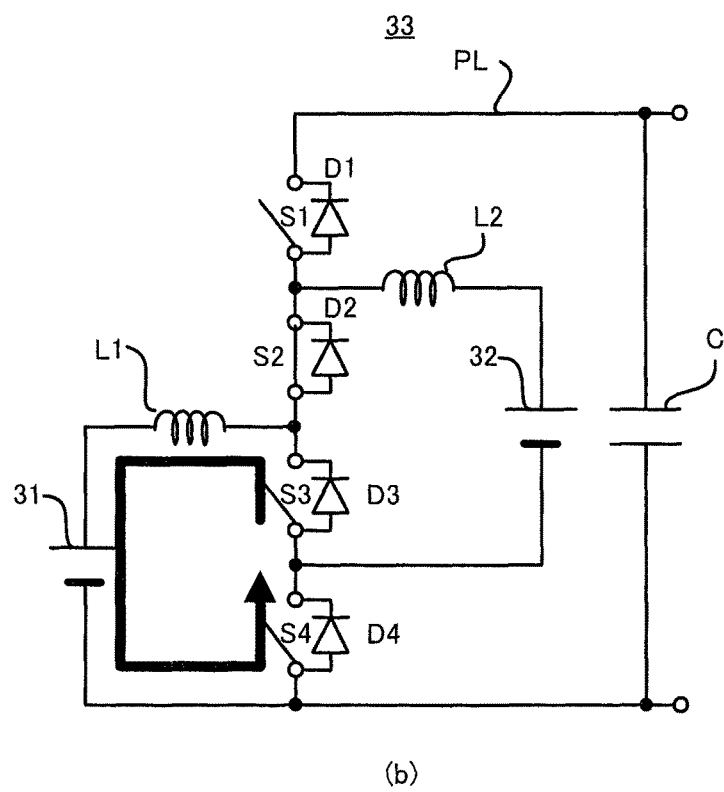
(b)

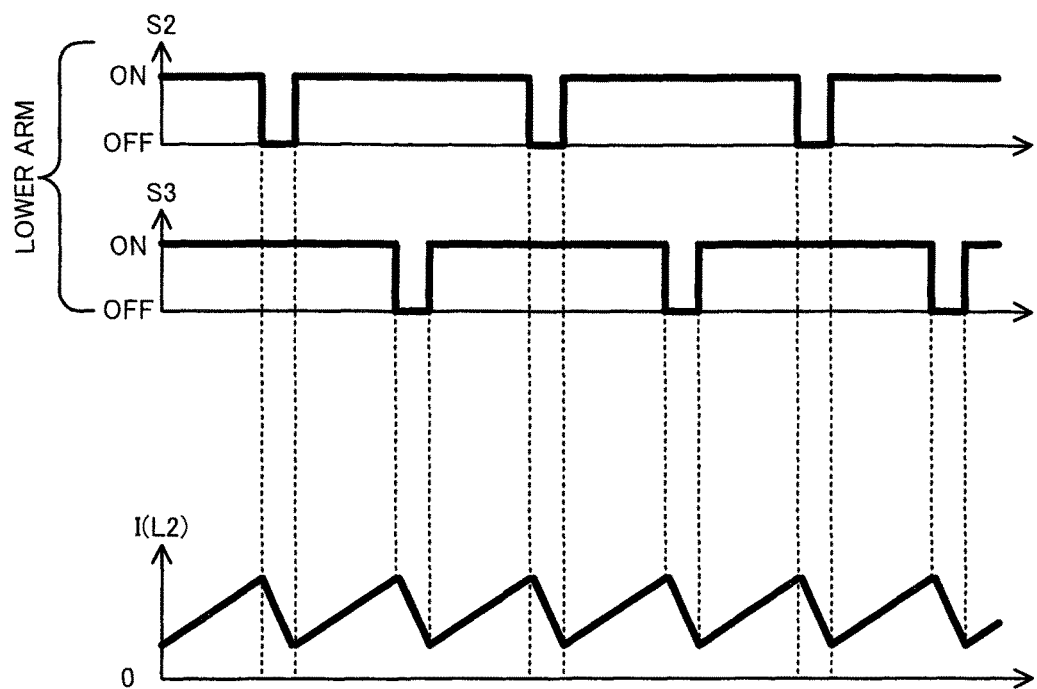
[FIG. 7]

[FIG. 8]
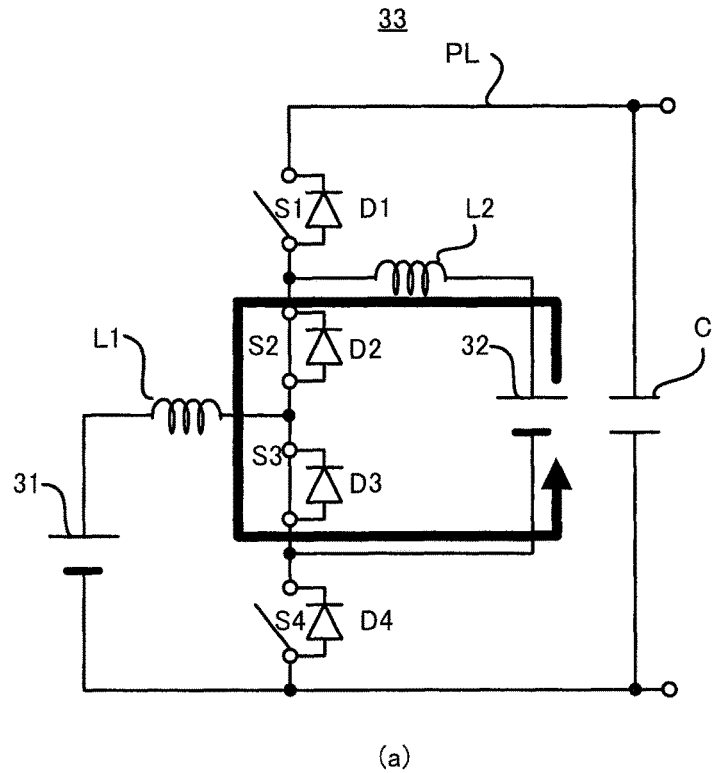
(a)
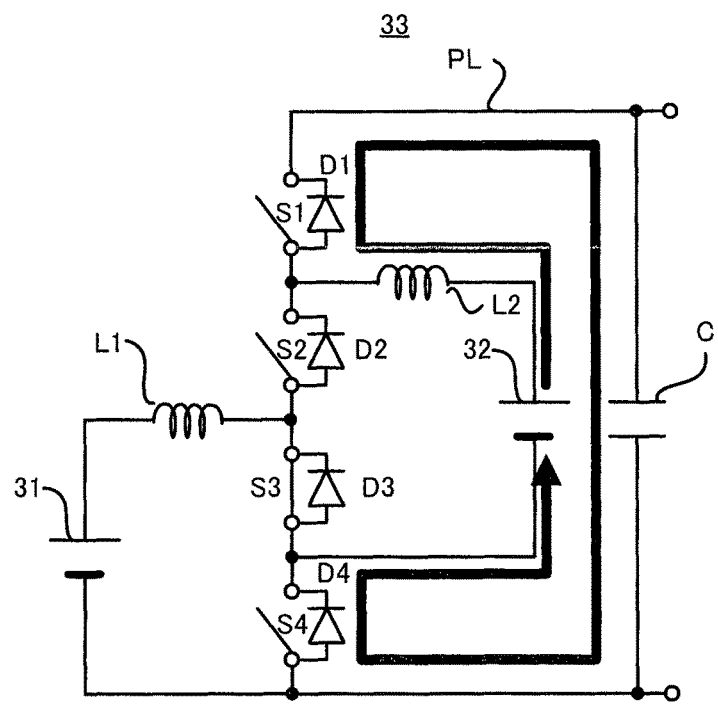
(b)

[FIG. 9]
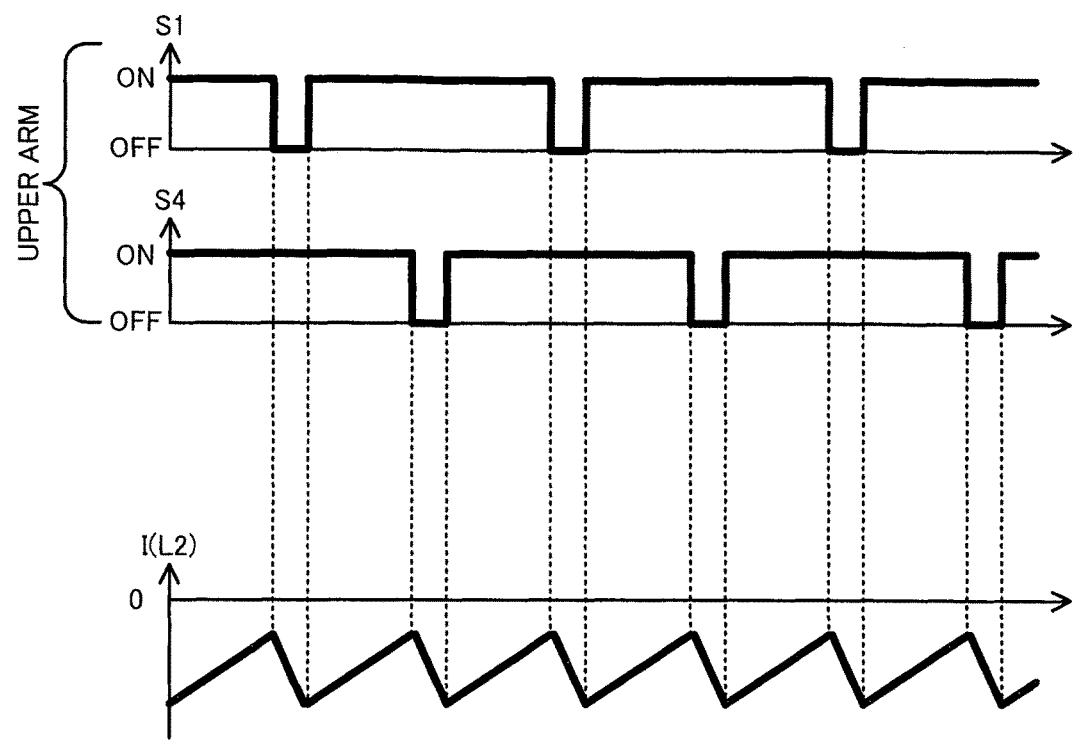

[FIG. 10]
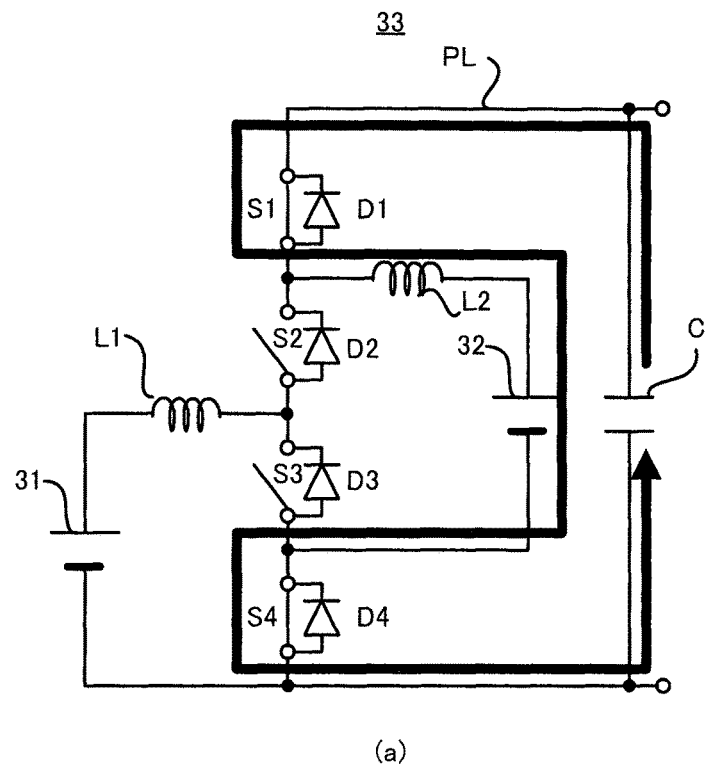
(a)
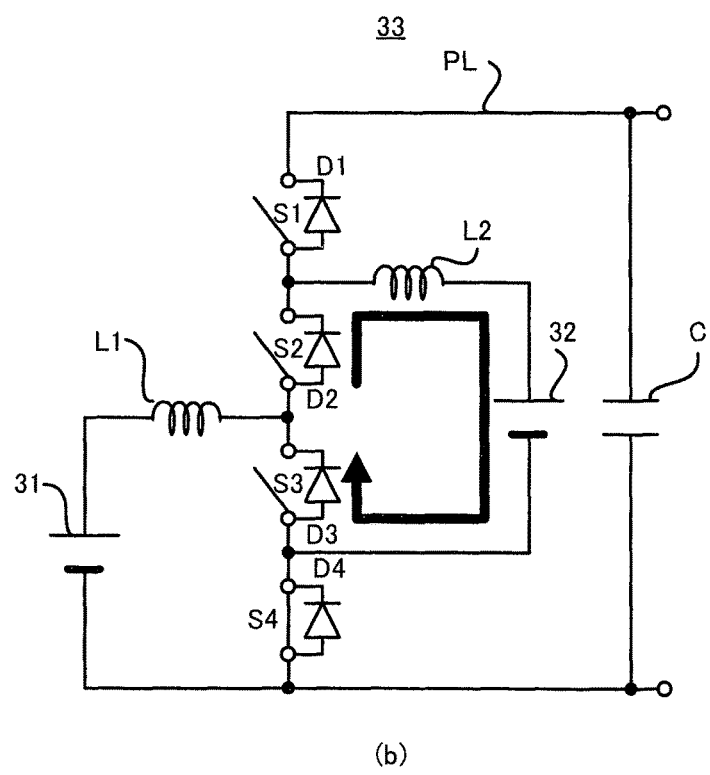
(b)

[FIG. 11]
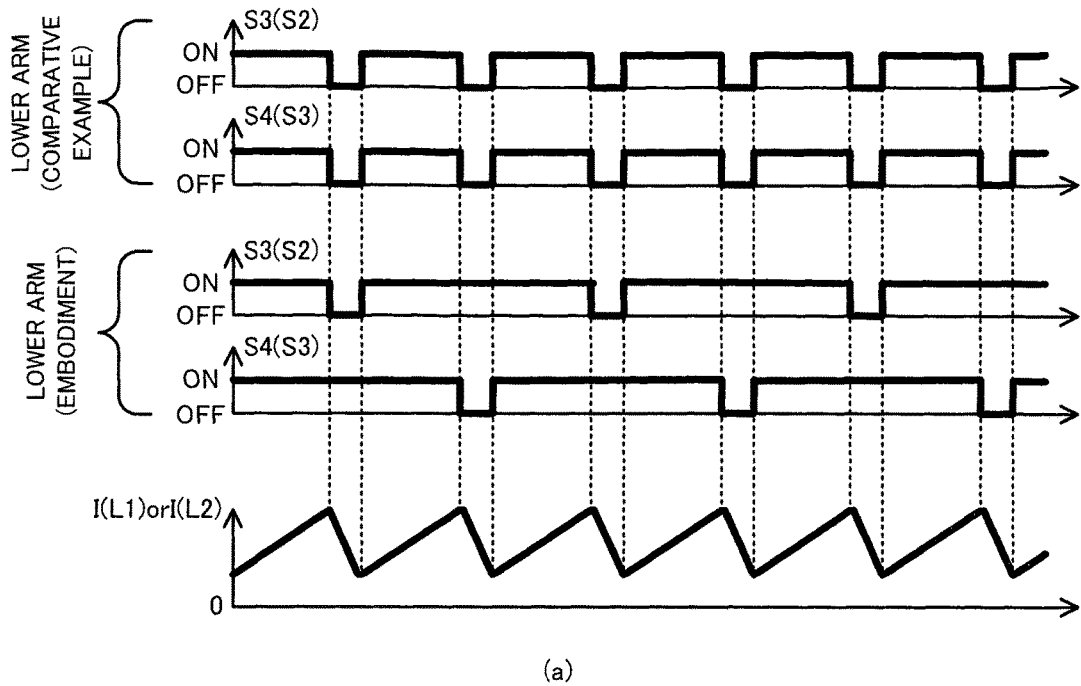
(a)
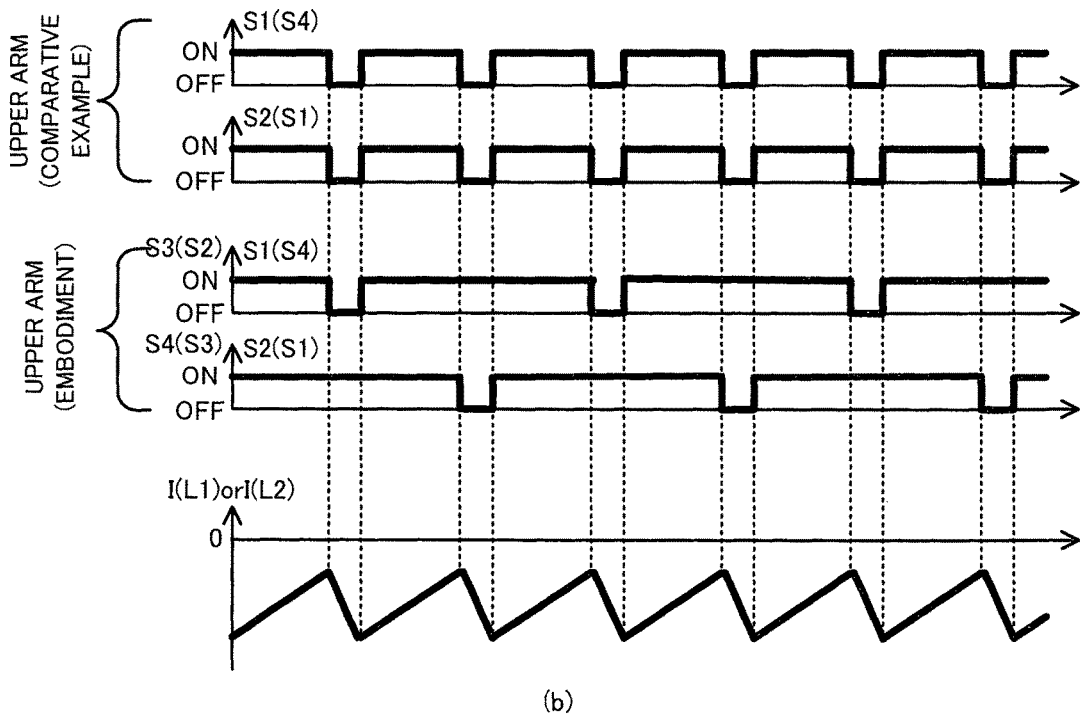
(b)

[FIG. 12]
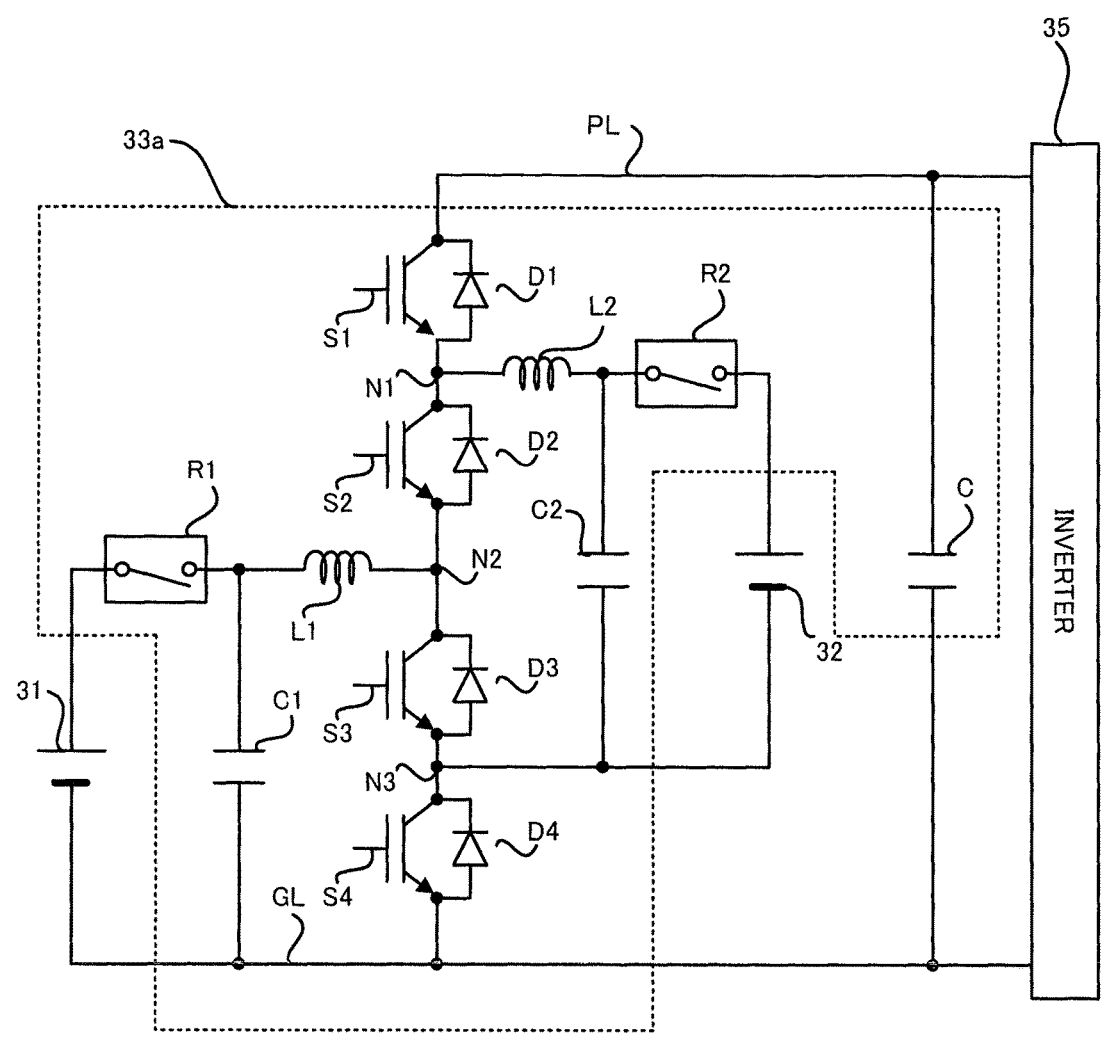

[FIG. 13]

< FIRST SINGLE OPERATION MODE :
POWER RUNNING STATE AND SECOND RELAY=OFF>

|    | L1 CHARGE         | L1 DISCHARGE          |
|----|-------------------|-----------------------|
| S1 | OFF               | OFF (LOSS REDUCED)    |
| S2 | ON (C2 SHORT)     | ON (C2 SHORT)         |
| S3 | ON                | ON (LOSS REDUCED)     |
| S4 | ON                | OFF                   |

(a)

|    | L1 CHARGE (S4 HIGH TEMPERATURE) | L1 DISCHARGE (S4 HIGH TEMPERATURE) |
|----|---------------------------------|------------------------------------|
| S1 | OFF (LOSS REDUCED)              | OFF (LOSS REDUCED)                 |
| S2 | ON (LOSS REDUCED)               | ON (LOSS REDUCED)                  |
| S3 | ON                              | OFF                                |
| S4 | ON                              | ON (LOSS REDUCED)                  |

< FIRST SINGLE OPERATION MODE :
REGENERATION STATE AND SECOND RELAY=OFF>

|    | L1 CHARGE       | L1 DISCHARGE          |
|----|-----------------|-----------------------|
| S1 | ON              | OFF                   |
| S2 | ON              | ON (LOSS REDUCED)     |
| S3 | ON (C2 SHORT)   | ON (C2 SHORT)         |
| S4 | OFF             | OFF (LOSS REDUCED)    |

(a)

|    | L1 CHARGE (S1 HIGH TEMPERATURE) | L1 DISCHARGE (S1 HIGH TEMPERATURE) |
|----|---------------------------------|------------------------------------|
| S1 | ON                              | ON (LOSS REDUCED)                  |
| S2 | ON                              | OFF                                |
| S3 | ON (LOSS REDUCED)               | ON (LOSS REDUCED)                  |
| S4 | OFF (LOSS REDUCED)              | OFF (LOSS REDUCED)                 |

< SECOND SINGLE OPERATION MODE :
POWER RUNNING STATE AND FIRST RELAY=OFF >

| | L2 CHARGE | L2 DISCHARGE |
|---|---|---|
| S1 | OFF | OFF (LOSS REDUCED) |
| S2 | ON | OFF |
| S3 | ON | ON (LOSS REDUCED) |
| S4 | ON (C1 SHORT) | ON (C1 SHORT) |

(a)

| | L2 CHARGE (S2 HIGH TEMPERATURE) | L2 DISCHARGE (S2 HIGH TEMPERATURE) |
|---|---|---|
| S1 | OFF (LOSS REDUCED) | OFF (LOSS REDUCED) |
| S2 | ON | ON (LOSS REDUCED) |
| S3 | ON | OFF |
| S4 | ON (LOSS REDUCED) | ON (LOSS REDUCED) |

< SECOND SINGLE OPERATION MODE :
REGENERATION STATE AND FIRST RELAY=OFF >

| | L2 CHARGE | L2 DISCHARGE |
|---|---|---|
| S1 | ON | OFF |
| S2 | OFF | OFF (LOSS REDUCED) |
| S3 | ON (C1 SHORT) | ON (C1 SHORT) |
| S4 | ON | ON (LOSS REDUCED) |

(a)

| | L2 CHARGE (S1 HIGH TEMPERATURE) | L2 DISCHARGE (S1 HIGH TEMPERATURE) |
|---|---|---|
| S1 | ON | ON (LOSS REDUCED) |
| S2 | OFF (LOSS REDUCED) | OFF (LOSS REDUCED) |
| S3 | ON (LOSS REDUCED) | ON (LOSS REDUCED) |
| S4 | ON | OFF |

< FIRST SINGLE OPERATION MODE :
POWER RUNNING STATE AND SECOND RELAY=ON>

|  | L1 CHARGE#1 | L1 DISCHARGE#1 | L1 CHARGE#2 | L1 DISCHARGE#2 |
|---|---|---|---|---|
| S1 | OFF | OFF (LOSS REDUCED) | OFF | OFF (LOSS REDUCED) |
| S2 | OFF | OFF (LOSS REDUCED) | OFF | OFF (LOSS REDUCED) |
| S3 | ON | ON (LOSS REDUCED) | ON | OFF |
| S4 | ON | OFF | ON | ON (LOSS REDUCED) |
| OPERATING CONDITION | ✕ | ✕ | ・V1≦V2→OPERATION ALLOWED<br>・V1>V2&CHARGE BETWEEN SOURCES ALLOWED→OPERATION ALLOWED<br>・V1>V2&CHARGE BETWEEN SOURCES NOT ALLOWED→OPERATION NOT ALLOWED | |

[FIG. 18]

< FIRST SINGLE OPERATION MODE :
REGENERATION STATE AND SECOND RELAY=ON>

|  | L1 CHARGE#1 | L1 DISCHARGE#1 | L1 CHARGE#2 | L1 DISCHARGE#2 |
|---|---|---|---|---|
| S1 | ON | ON (LOSS REDUCED) | ON | OFF |
| S2 | ON | OFF | ON | ON (LOSS REDUCED) |
| S3 | OFF | OFF (LOSS REDUCED) | OFF | OFF (LOSS REDUCED) |
| S4 | OFF | OFF (LOSS REDUCED) | OFF | OFF (LOSS REDUCED) |
| OPERATING CONDITION | ・V1≧V2→OPERATION ALLOWED<br>・V1<V2&CHARGE BETWEEN SOURCES ALLOWED→OPERATION ALLOWED<br>・V1<V2&CHARGE BETWEEN SOURCES NOT ALLOWED→OPERATION NOT ALLOWED | | ・V1≧V2→OPERATION ALLOWED<br>・V1<V2&CHARGE BETWEEN SOURCES ALLOWED→OPERATION ALLOWED<br>・V1<V2&CHARGE BETWEEN SOURCES NOT ALLOWED→OPERATION NOT ALLOWED | |

[FIG. 19]

< SECOND SINGLE OPERATION MODE :
POWER RUNNING STATE AND FIRST RELAY=ON>

|  | L2 CHARGE#1 | L2 DISCHARGE#1 | L2 CHARGE#2 | L2 DISCHARGE#2 (V1≧V2) |
|---|---|---|---|---|
| S1 | OFF | OFF (LOSS REDUCED) | OFF | OFF (LOSS REDUCED) |
| S2 | ON | OFF | ON | ON (LOSS REDUCED) |
| S3 | ON | ON (LOSS REDUCED) | ON | OFF |
| S4 | OFF | OFF (LOSS REDUCED) | OFF | OFF (LOSS REDUCED) |
| OPERATING CONDITION | | | ・V1≧V2→OPERATION ALLOWED<br>・V1<V2&CHARGE BETWEEN SOURCES ALLOWED→OPERATION ALLOWED<br>・V1<V2&CHARGE BETWEEN SOURCES NOT ALLOWED→OPERATION NOT ALLOWED | |

[FIG. 20]

< SECOND SINGLE OPERATION MODE :
REGENERATION STATE AND FIRST RELAY=ON>

|  | L2 CHARGE#1 | L2 DISCHARGE#1 | L2 CHARGE#2 | L2 DISCHARGE#2 |
|---|---|---|---|---|
| S1 | ON | ON (LOSS REDUCED) | ON | OFF |
| S2 | OFF | OFF (LOSS REDUCED) | OFF | OFF (LOSS REDUCED) |
| S3 | OFF | OFF (LOSS REDUCED) | OFF | OFF (LOSS REDUCED) |
| S4 | ON | OFF | ON | ON (LOSS REDUCED) |
| OPERATING CONDITION | ・V1≦V2→OPERATION ALLOWED<br>・V1>V2&CHARGE BETWEEN SOURCES ALLOWED→OPERATION ALLOWED<br>・V1>V2&CHARGE BETWEEN SOURCES NOTALLOWED→OPERATION NOT ALLOWED | | ・V1≦V2→OPERATION ALLOWED<br>・V1>V2&CHARGE BETWEEN SOURCES ALLOWED→OPERATION ALLOWED<br>・V1>V2&CHARGE BETWEEN SOURCES NOT ALLOWED→OPERATION NOT ALLOWED | |

# ELECTRICAL SOURCE SYSTEM

Cross-Reference to Related Applications

This is a national phase application based on the PCT International Patent Application No. PCT/JP2015/054189 filed Feb. 10, 2015, claiming priority to Japanese Patent Application No. 2014-055379 filed Mar. 18, 2014, the entire contents of both of which are incorporated herein by reference.

TECHNICAL FIELD

The present invention relates to an electrical source system having an electrical power converter which is configured to perform an electrical power conversion with an electricity storage apparatus, for example.

BACKGROUND ART

An electrical power converter, which is configured to perform an electrical power conversion with an electricity storage apparatus such as a secondary battery, a capacitor and the like by changing a switching state of switching element, is known. Especially, the electrical power converter which is configured to perform the electrical power conversion with a plurality of electricity storage apparatuses is proposed, as disclosed in a Patent Literature 1. The electrical power converter like this has three or more switching elements which are electrically connected in series as the switching elements which are used to perform the electrical power conversion with the plurality of electricity storage apparatuses. For example, the electrical power converter for a vehicle, which moves by using the electrical power outputted from two electricity storage apparatuses, has four switching elements which are electrically connected in series as the switching elements which are used to simultaneously perform the electrical power conversion with two electricity storage apparatuses.

CITATION LIST

Patent Literature

Patent Literature 1: Japanese Patent Application Laid Open No. 2013-013234

SUMMARY OF INVENTION

Technical Problem

It is preferable that a switching loss in the switching element be reduced in the electrical power converter having the switching element. In the Patent Literature 1, a phase difference between the first carrier signal and the second carrier signal is properly changed to reduce the switching loss, wherein the first carrier signal is used to control the electrical power conversion with the first electricity storage apparatus and the second carrier signal is used to control the electrical power conversion with the second electricity storage apparatus. In this case, an electrical current which flows through the first electricity storage apparatus and an electrical current which flows through the second electricity storage apparatus cancel each other by properly changing the phase difference. As a result, the switching loss is reduced.

The Patent Literature 1 uses the electrical power converter which is configured to operate in an operation mode by which the electrical power converter simultaneously performs the electrical power conversion with the first electricity storage apparatus and the electrical power conversion with the second electricity storage apparatus. On the other hand, the electrical power converter sometimes operate in an operation mode by which the electrical power converter performs only the electrical power conversion with the first electricity storage apparatus.

However, when the electrical power converter operates in this operation mode, the electrical power converter does not perform the electrical power conversion with the second electricity storage apparatus and thus the electrical current does not flow through the second electricity storage apparatus. Thus, the electrical current which flows through the first electricity storage apparatus and the electrical current which flows through the second electricity storage apparatus do not cancel each other on the switching element. Thus, there is a possibility that a controlling method disclosed in the Patent Literature 1 is not capable of reducing the switching loss.

Even in the case where the electrical power converter performs only the electrical power conversion with the second electricity storage apparatus, there is a possibility that the controlling method disclosed in the Patent Literature 1 is not capable of reducing the switching loss.

The subject to be solved by the present invention discussed herein includes the above as one example. It is therefore an object of the present invention to provide an electrical source system which is capable of reducing the switching loss of the electrical power converter which operates in the operation mode by which the electrical power converter performs the electrical power conversion with one of the first electricity storage apparatus and the second electricity storage apparatus.

Solution to Problem

<1>

One aspect of an electrical source system of the present invention has a first electricity storage apparatus; a second electricity storage apparatus; an electrical power converter having a plurality of switching elements which are electrical connected in series, each of the plurality of switching elements being located in both of a first electrical power conversion path and a second electrical power conversion path, the first electrical conversion path passing through the first electricity storage apparatus and being used to perform an electrical power conversion with the first electricity storage apparatus, the second electrical conversion path passing through the second electricity storage apparatus and being used to perform an electrical power conversion with the second electricity storage apparatus; and a control apparatus which is configured to control an operation of the electrical power converter, wherein when the electrical power converter operates in a predetermined mode by which the electrical power converter performs the electrical power conversion with one electricity storage apparatus of the first electricity storage apparatus and the second electricity storage apparatus, the control apparatus controls the electrical power converter to change a switching state of one of at least two switching elements of the plurality of switching elements while keeping a switching state of another one of the at least two switching elements in an ON state, each of the at least two switching elements constitutes predetermined arm element whose switching state should be changed to perform the electrical power conversion with the one electricity storage apparatus.

According to one aspect of the electrical source system of the present invention, the electrical power converter is capable of performing the electrical power conversion with the first electricity storage apparatus and the second electricity storage apparatus under the control of the control apparatus. The electrical power converter has the plurality of switching elements to perform the electrical power conversion with the first electricity storage apparatus and the second electricity storage apparatus.

Each of the plurality of switching elements is located in the first electrical power conversion path which passes through the first electricity storage apparatus and is used to perform the electrical power conversion with the first electricity storage apparatus. Moreover, each of the plurality of switching elements is located in the second electrical power conversion path which passes through the second electricity storage apparatus and is used to perform the electrical power conversion with the second electricity storage apparatus, in addition to the first electrical power conversion path. Moreover, the plurality of switching elements are electrically connected in series. The electrical power converter is capable of performing the electrical power conversion with the first electricity storage apparatus and the second electricity storage apparatus by properly changing the switching states of the plurality of switching elements which are locates as described above.

The electrical power converter is capable of operating in the predetermined mode by which the electrical power converter performs the electrical power conversion with one electricity storage apparatus of the first and second electricity storage apparatuses. For example, when a SOC (State Of Charge) of the other electricity storage apparatus is excessively low or the other electricity storage apparatus is subject to an output limitation (for example, a Wout limitation), the electrical power converter is capable of operating in the predetermined mode. However, the electrical power converter may operates in an operation mode by which the electrical power converter simultaneously performs the electrical power conversion with the first electricity storage apparatus and the electrical power conversion with the second electricity storage apparatus.

Especially in this aspect, the control apparatus controls the electrical power converter to operates in a below described manner, mainly in order to reduce a switching loss of the electrical power converter which operates in the predetermined mode.

Specifically, the electrical power converter changes the switching state of one of the at least two switching elements each of which constitutes the predetermined arm element while keeping the switching state of another one of the at least two switching elements in the ON state. The "predetermined arm element" is a switching element of the plurality of switching elements whose switching state is desired to be changed to perform the electrical power conversion with the one electricity storage apparatus. As described below in detail, the predetermined arm element is a lower arm for the one electricity storage apparatus when an electrical power is outputted from the one electricity storage apparatus (namely, the one electricity storage apparatus discharges). On the other hand, the predetermined arm element is an upper arm for the one electricity storage apparatus when an electrical power is inputted to the one electricity storage apparatus (namely, the one electricity storage apparatus is charged).

Since the electrical power converter operates in the above described manner, the number of the switching (the number of the change of the switching state) in this aspect is smaller than the number of the switching in the case where the switching states of all of the at least two switching elements are changed simultaneously or in parallel. Therefore, the switching loss is also reduced due to the reduction of the number of the switching.

Especially in this aspect, the reduction of the number of the switching results in the reduction of the switching loss. Namely, the switching loss is reduced without using cancellation of an electrical current which flows through the first electricity storage apparatus and an electrical current which flows through the second electricity storage apparatus. Therefore, in this aspect of, the switching loss is effectively reduced even when the electrical power converter operates in the predetermined mode by which the electrical power converter performs the electrical power conversion with the one electricity storage apparatus and does not perform the electrical power conversion with the other electricity storage apparatus.

<2>

In another aspect of the electrical source system of the present invention, the control apparatus controls the electrical power converter to alternately perform a first operation and a second operation when the electrical power converter operates in the predetermined mode, a switching state of second switching element of the at least two switching elements is changed while a switching state of first switching element of the at least two switching elements is kept in the ON state by the first operation, the switching state of the first switching element is changed while the switching state of the second switching element is kept in the ON state by the second operation.

According to this aspect, a difference between the number of the switching of one of the at least two switching elements each of which constitutes the predetermined arm element and the number of the switching of another one of the at least two switching elements each of which constitutes the predetermined arm element becomes relatively small. Therefore, an excessive heat generation of any one of the at least two switching elements each of which constitutes the predetermined arm element is effectively prevented.

<3>

In another aspect of the electrical source system of the present invention, the predetermined arm element is a lower arm for the one electricity storage apparatus, when an electrical power is outputted from the one electricity storage apparatus, the predetermined arm element is an upper arm for the one electricity storage apparatus, when an electrical power is inputted to the one electricity storage apparatus.

According to this aspect, when the electrical power is outputted from the one electricity storage apparatus, the switching state of one of the at least two switching elements each of which constitutes the lower arm for the one electricity storage apparatus is changed while the switching state of another one of the at least two switching elements each of which constitutes the lower arm is kept in the ON state. As a result, the switching loss is effectively reduced when the electrical power is outputted from the one electricity storage apparatus. Incidentally, the state at which the electrical power is outputted from the one electricity storage apparatus is equivalent to the state at which the one electricity storage apparatus discharges.

When the electrical power is inputted to the one electricity storage apparatus, the switching state of one of the at least two switching elements each of which constitutes the upper arm for the one electricity storage apparatus is changed while the switching state of another one of the at least two switching elements each of which constitutes the upper arm is kept in the ON state. As a result, the switching loss is effectively reduced when the electrical power is inputted to the one electricity storage apparatus. Incidentally, the state at which the electrical power is inputted to the one electricity storage apparatus is equivalent to the state at which the one electricity storage apparatus is charged.

<4>

In another aspect of the electrical power system of the present invention, the control apparatus controls the electrical power converter to keep a switching state of at least one switching element of the plurality of switching elements which does not constitute the predetermined arm element in an OFF state.

According to this aspect, an electrical current does not flow into or flow from the other electricity storage apparatus which should not perform the electrical power conversion, when the electrical power converter operates in the predetermined mode. Therefore, the electrical power converter is capable of operating in the predetermined mode by which the electrical power converter performs the electrical power conversion with the one electricity storage apparatus and does not perform the electrical power conversion with the other electricity storage apparatus Incidentally, it is preferable that the switching state of at least one switching element which constitutes the upper arm for the one electricity storage apparatus be kept in the OFF state, when the electrical power is outputted from the one electricity storage apparatus. It is preferable that the switching state of at least one switching element which constitutes the lower arm for the one electricity storage apparatus be kept in the OFF state, when the electrical power is inputted to the one electricity storage apparatus.

<5>

In another aspect of the electrical power system which keeps the switching state of at least one switching element which does not constitute the predetermined arm element in an OFF state as described above, the electrical power converter has a first switching element, a second switching element, a third switching element and a fourth switching element as the plurality of switching elements, the first switching element constitutes an upper arm for the first electricity storage apparatus and an upper arm for the second electricity storage apparatus, the second switching element constitutes the upper arm for the first electricity storage apparatus and a lower arm for the second electricity storage apparatus, the third switching element constitutes a lower arm for the first electricity storage apparatus and the lower arm for the second electricity storage apparatus, the fourth switching element constitutes the lower arm for the first electricity storage apparatus and the upper arm for the second electricity storage apparatus, the at least one switching element which does not constitute the predetermined arm element is the first switching element, when the one electricity storage apparatus is the first electricity storage apparatus and an electrical power is outputted from the first electricity storage apparatus, the at least one switching element which does not constitute the predetermined arm element is the fourth switching element, when the one electricity storage apparatus is the first electricity storage apparatus and an electrical power is inputted to the first electricity storage apparatus, the at least one switching element which does not constitute the predetermined arm element is the first switching element, when the one electricity storage apparatus is the second electricity storage apparatus and an electrical power is outputted from the second electricity storage apparatus, the at least one switching element which does not constitute the predetermined arm element is the second switching element, when the one electricity storage apparatus is the second electricity storage apparatus and an electrical power is inputted to the second electricity storage apparatus.

According to this aspect, an electrical current does not flow into or flow from the other electricity storage apparatus which should not perform the electrical power conversion, when the electrical power converter operates in the predetermined mode.

Therefore, the electrical power converter is capable of operating in the predetermined mode by which the electrical power converter performs the electrical power conversion with the one electricity storage apparatus and does not perform the electrical power conversion with the other electricity storage apparatus An operation and another advantage of the present invention will become more apparent from the embodiments explained below. The object and advantages of the present invention will be realized and attained by means of the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 1 is a block diagram illustrating a structure of a vehicle of a present embodiment.

FIG. 2 is a circuit diagram illustrating a circuit structure of an electrical power converter.

FIG. 3 is a timing chart which illustrates switching states of switching elements and an electrical current which flows through a reactor under a situation where the electrical power converter operates in a first single operation mode and the vehicle is in a power running state.

Each of FIG. 4(a) and FIG. 4(b) is a circuit diagram which illustrates an electrical current path in the electrical power converter under the situation where the electrical power converter operates in the first single operation mode and the vehicle is in the power running state.

FIG. 5 is a timing chart which illustrates switching states of the switching elements and the electrical current which flows through the reactor under a situation where the electrical power converter operates in the first single operation mode and the vehicle is in a regeneration state.

Each of FIG. 6(a) and FIG. 6(b) is a circuit diagram which illustrates the electrical current path in the electrical power converter under the situation where the electrical power converter operates in the first single operation mode and the vehicle is in the regeneration state.

FIG. 7 is a timing chart which illustrates switching states of the switching elements and an electrical current which flows through the reactor under a situation where the electrical power converter operates in a second single operation mode and the vehicle is in the power running state.

Each of FIG. 8(a) and FIG. 8(b) is a circuit diagram which illustrates an electrical current path in the electrical power converter under the situation where the electrical power converter operates in the second single operation mode and the vehicle is in the power running state.

FIG. 9 is a timing chart which illustrates switching states of the switching elements and the electrical current which flows through the reactor under a situation where the electrical power converter operates in the second single operation mode and the vehicle is in the regeneration state.

Each of FIG. 10(*a*) and FIG. 10(*b*) is a circuit diagram which illustrates an electrical current path in the electrical power converter under the situation where the electrical power converter operates in the second single operation mode and the vehicle is in the regeneration state.

Each of FIG. 11(*a*) and FIG. 11(*b*) is a timing chart which illustrates the switching states of the switching elements of an electrical source system in a comparative example in which the switching states of two switching elements each of which is the upper arm or the lower arm are changed simultaneously.

FIG. 12 is a circuit diagram illustrating the circuit structure of the electrical power converter in the modified example.

Each of FIG. 13(*a*) and FIG. 13(*b*) is a table which illustrates the switching states of the switching elements in a first example of a modified operation in which the electrical power converter operates in the first single operation mode under a situation where a second relay is in the OFF state (moreover, a first relay is in the ON state) and the vehicle is in the power running state.

Each of FIG. 14(*a*) and FIG. 14(*b*) is a table which illustrates the switching states of the switching elements in a second example of the modified operation in which the electrical power converter operates in the first single operation mode under a situation where the second relay is in the OFF state (moreover, the first relay is in the ON state) and the vehicle is in the regeneration state.

Each of FIG. 15(*a*) and FIG. 15(*b*) is a table which illustrates the switching states of the switching elements in a third example of the modified operation in which the electrical power converter operates in the second single operation mode under a situation where the first relay is in the OFF state (moreover, the second relay is in the ON state) and the vehicle is in the power running state.

Each of FIG. 16(*a*) and FIG. 16(*b*) is a table which illustrates the switching states of the switching elements in a fourth example of the modified operation in which the electrical power converter operates in the second single operation mode under a situation where the first relay is in the OFF state (moreover, the second relay is in the ON state) and the vehicle is in the regeneration state.

FIG. 17 is a table which illustrates the switching states of the switching elements in a fifth example of the modified operation in which the electrical power converter operates in the first single operation mode under a situation where the second relay is in the ON state (moreover, the first relay is in the ON state) and the vehicle is in the power running state.

FIG. 18 is a table which illustrates the switching states of the switching elements in a sixth example of the modified operation in which the electrical power converter operates in the first single operation mode under a situation where the second relay is in the ON state (moreover, the first relay is in the ON state) and the vehicle is in the regeneration state.

FIG. 19 is a table which illustrates the switching states of the switching elements in a seventh example of the modified operation in which the electrical power converter operates in the second single operation mode under a situation where the first relay is in the ON state (moreover, the second relay is in the ON state) and the vehicle is in the power running state.

FIG. 20 is a table which illustrates the switching states of the switching elements in a eighth example of the modified operation in which the electrical power converter operates in the second single operation mode under a situation where the first relay is in the ON state (moreover, the second relay is in the ON state) and the vehicle is in the regeneration state.

DESCRIPTION OF EMBODIMENTS

Hereinafter, an embodiment of the electrical source system of the present invention will be explained. Incidentally, in the following explanation, an embodiment in which the electrical source system of the present invention is applied to a vehicle (especially, a vehicle which moves (drives) by using an electrical power outputted from the electricity storage apparatus) will be explained. However, the electrical source system may be applied to any equipment other than the vehicle.

(1) Structure of Vehicle

Firstly, with reference to FIG. 1, the structure of the vehicle 1 of the present embodiment will be explained. FIG. 1 is a block diagram illustrating the structure of the vehicle 1 of the present embodiment.

As illustrated in FIG. 1, the vehicle 1 has a motor generator 10, an axle shaft 21, wheels 22 and an electrical source system 30.

The motor generator 10 operates by using an electrical power outputted from the electrical source system 30 to function as a motor for supplying a power (namely, a power which is required for the vehicle 1 to move) to the axle shaft 21 by, when the vehicle 1 is in a power running state. Furthermore, the motor generator 10 functions as a generator for charging a first electrical source 31 and a second electrical source 32 in the electrical source system 30, when the vehicle 1 is in a regeneration state.

Incidentally, the vehicle 1 may have two or more motor generators 10. Furthermore, the vehicle 1 may have an engine in addition to the motor generator 10.

The electrical source system 30 outputs the electrical power, which is required for the motor generator 10 to function as the motor, to the motor generator 10, when the vehicle 1 is in the power running state. Furthermore, the electrical power which is generated by the motor generator 10 functioning as the generator is inputted from the motor generator 10 to the electrical source system 30, when the vehicle 1 is in the regeneration state.

The electrical source system 30 has the first electrical source 31 which is one example of the "first electricity storage apparatus", the second electrical source 32 which is one example of the "second electricity storage apparatus", an electrical power converter 33, an inverter 35 and PCT (Power Control Unit) which is one example of the "control apparatus".

Each of the first electrical source 31 and the second electrical source 32 is an electrical source which is capable of outputting the electrical power (namely, discharging). Each of the first electrical source 31 and the second electrical source 32 may be an electrical source to which the electrical power can be inputted (namely, which can be charged), in addition to be capable of outputting the electrical power. At least one of the first electrical source 31 and the second electrical source 32 may be a lead battery, a lithium-ion battery, a nickel-hydrogen battery, a fuel battery, an electrical double layer capacitor or the like, for example.

The electrical power converter 33 converts the electrical power which is outputted from the first electrical source 31 and the electrical power which is outputted from the second electrical source 32 depending on a required electrical power which is required for the electrical source system 30 (in this case, the required electrical power is an electrical power which the electrical source system 30 should output to the motor generator 10, for example), under the control of the PCU 36. The electrical power converter 33 outputs the converted electrical power to the inverter 35. Furthermore, the electrical power converter 33 converts the electrical power which is inputted from the inverter 35 (namely, the electrical power which is generated by the regeneration of the motor generator 10) depending on the required electrical power which is required for the electrical source system 30 (in this case, the required electrical power is an electrical power which should be inputted to the electrical source system 30, and the required electrical power is substantially an electrical power which should be inputted to the first electrical source 31 and the second electrical source 32, for example), under the control of the PCU 36. The electrical power converter 33 outputs the converted electrical power to at least one of the first electrical source 31 and the second electrical source 32. The above described electrical power conversion allows the electrical power converter 33 to distribute the electrical power among the first electrical source 31, the second electrical source 32 and the inverter 35.

The inverter 35 converts the electrical power (DC (direct current) electrical power), which is outputted from the electrical power converter 33, to an AC (alternating current) electrical power, when the vehicle 1 is in the power running state. Then, the inverter 35 supplies the electrical power, which is converted to the AC electrical power, to the motor generator 10. Furthermore, the inverter 35 converts the electrical power (AC electrical power), which is generated by the motor generator 10, to the DC electrical power. Then, the inverter 35 supplies the electrical power, which is converted to the DC electrical power, to the electrical power converter 33.

The PCU 36 is an electrical controlling unit which is configured to control the whole of the operation of the electrical source system 30.

(2) Circuit Structure of Electrical Power Converter

Next, with reference to FIG. 2, the circuit structure of the electrical power converter 33 will be explained. FIG. 2 is a circuit diagram illustrating the circuit structure of the electrical power converter 33.

As illustrated in FIG. 2, the electrical power converter 33 has a switching element S1 which is one example of the "first switching element", a switching element S2 which is one example of the "second switching element", a switching element S3 which is one example of the "third switching element", a switching element S4 which is one example of the "fourth switching element", a diode D1, a diode D2, a diode D3, a diode D4, a reactor L1, a reactor L2 and a smoothing capacitor C.

The switching element S1 is capable of changing a switching state thereof depending on a control signal which is supplied from the PCU 36. Namely, the switching element S1 is capable of changing the switching state thereof from an ON state to an OFF state or from the OFF state to the ON state depending on the control signal which is supplied from the PCU 36. An IGBT (Insulated Gate Bipolar Transistor), a MOS (Metal Oxide Semiconductor) transistor for the electrical power or a bipolar transistor for the electrical power may be used as the switching element S1. The above explanation on the switching element S1 can be applied to the remaining switching elements S2 to S4.

The switching elements S1 to S4 are electrically connected in series between an electrical source line PL and a ground line GL. Specifically, the switching element S1 is electrically connected between the electrical source line PL and a node N1. The switching element S2 is electrically connected between the node N1 and a node N2. The switching element S3 is electrically connected between the node N2 and a node N3. The switching element S4 is electrically connected between the node N3 and the ground line GL.

The diode D1 is electrically connected in parallel to the switching element S1. The diode D2 is electrically connected in parallel to the switching element S2. The diode D3 is electrically connected in parallel to the switching element S3. The diode D4 is electrically connected in parallel to the switching element S4. Incidentally, the diode D1 is connected in an inverse-parallel manner to the switching element S1. Same argument can be applied to the remaining diodes D2 to D4.

The reactor L1 is electrically connected between a positive terminal of the first electrical source 31 and the node N2. The reactor L2 is electrically connected between a positive terminal of the second electrical source 32 and the node N1. The smoothing capacitor C is electrically connected between the electrical source line PL and the ground line GL. A negative terminal of the first electrical source 31 is electrically connected to the ground line GL. A negative terminal of the second electrical source 32 is electrically connected to the node N3. The inverter 35 is electrically connected between the electrical source line PL and the ground line GL.

The electrical power converter 33 has a chopper circuit for each of the first electrical source 31 and the second electrical source 32. As a result, the electrical power converter 33 is capable of performing the electrical power conversion with the first electrical source 31 and the second electrical source 32.

Specifically, a first chopper circuit in which each of the switching elements S1 and S2 is an upper arm and each of the switching elements S3 and S4 is a lower arm is prepared for the first electrical source 31. The first chopper circuit may function as a boost chopper circuit for the first electrical source 31, when the vehicle 1 is in the power running state. In this case, the electrical power which is outputted from the first electrical source 31 is stored in the reactor L1 during a period in which the switching elements S3 and S4 are in the ON state. The electrical power which is stored in the reactor L1 is supplied to the electrical source line PL via at least one portion of the switching elements S1 and S2 and the diodes D1 and D2 during a period in which at least one of the switching elements S3 and S4 is in the OFF state. On the other hand, the first chopper circuit may function as a step-down chopper circuit for the first electrical source 31, when the vehicle 1 is in the regeneration state. In this case, the electrical power which is generated by the regeneration is stored in the reactor L1 during a period in which the switching elements S1 and S2 are in the ON state. The electrical power which is stored in the reactor L1 is supplied to the ground line GL via at least one portion of the switching elements S3 and S4 and the diodes D3 and D4 during a period in which at least one of the switching elements S1 and S2 is in the OFF state.

On the other hand, a second chopper circuit in which each of the switching elements S4 and S1 is an upper arm and each of the switching elements S2 and S3 is a lower arm is prepared for the second electrical source 32. The second chopper circuit may function as a boost chopper circuit for the second electrical source 32, when the vehicle 1 is in the power running state. In this case, the electrical power which is outputted from the second electrical source 32 is stored in the reactor L2 during a period in which the switching elements S2 and S3 are in the ON state. The electrical power which is stored in the reactor L2 is supplied to the electrical source line PL via at least one portion of the switching elements S1 and S4 and the diodes D1 and D4 during a period in which at least one of the switching elements S2 and S3 is in the OFF state. On the other hand, the second chopper circuit may function as a step-down chopper circuit for the second electrical source 32, when the vehicle 1 is in the regeneration state. In this case, the electrical power which is generated by the regeneration is stored in the reactor L2 during a period in which the switching elements S1 and S4 are in the ON state. The electrical power which is stored in the reactor L2 is supplied to a line to which the negative terminal of the second electrical source 32 is connected via at least one portion of the switching elements S2 and S3 and the diodes D2 and D3 during a period in which at least one of the switching elements S1 and S4 is in the OFF state.

Incidentally, a fluctuation of an electrical voltage between the electrical source line PL and the ground line GL, which is caused by the change of the switching states of the switching elements S1 to S4, is suppressed by the smoothing capacitor C.

(3) Operation of Electrical Power Converter

Next, with reference to FIG. 3 to FIG. 11(a) and FIG. 11(b), an operation of the electrical power converter 33 will be explained. Especially, in the below described explanation, an operation of the electrical power converter 33 in a single operation mode (a single electrical source operation mode), by which the electrical power converter 33 performs the electrical power conversion with one of the first electrical source 31 and the second electrical source 32 (in other words, the electrical power converter 33 does not perform the electrical power conversion with the other one of the first electrical source 31 and the second electrical source 32), will be explained. Namely, the operation of the electrical power converter 33 in the single operation mode, by which an electrical current flows between the electrical power converter 33 and one of the first electrical source 31 and the second electrical source 32 (in other words, an electrical current does not flow between the electrical power converter 33 and the other one of the first electrical source 31 and the second electrical source 32), will be explained. However, the electrical power converter 33 may operate in a dual operation mode (dual electrical source operation mode/plural electrical source operation mode) by which the electrical power converter 33 simultaneously performs the electrical power conversion with the first electrical source 31 and the electrical power conversion with the second electrical source 32.

Incidentally, the below described operation of the electrical power converter 33 is performed under the control of the PCU 36. Namely, the PCU 36 controls the electrical power converter 33 such that the electrical power converter 33 operates in the below described manner.

(3-1) First Single Operation Mode Using First Electrical Source 31

Firstly, with reference to FIG. 3 to FIG. 6(a) and FIG. 6(b), an operation of the electrical power converter 33 in a first single operation mode, by which the electrical power converter 33 performs the electrical power conversion with the first electrical source 31, will be explained. FIG. 3 is a timing chart which illustrates a switching state of each of the switching elements S3 and S4 and an electrical current I(L1) which flows through the reactor L1 under a situation where the electrical power converter 33 operates in the first single operation mode and the vehicle 1 is in the power running state. Each of FIG. 4(a) and FIG. 4(b) is a circuit diagram which illustrates an electrical current path in the electrical power converter 33 under the situation where the electrical power converter 33 operates in the first single operation mode and the vehicle 1 is in the power running state. FIG. 5 is a timing chart which illustrates a switching state of each of the switching elements S1 and S2 and an electrical current I(L1) which flows through the reactor L1 under a situation where the electrical power converter 33 operates in the first single operation mode and the vehicle 1 is in the regeneration state. Each of FIG. 6(a) and FIG. 6(b) is a circuit diagram which illustrates an electrical current path in the electrical power converter 33 under the situation where the electrical power converter 33 operates in the first single operation mode and the vehicle 1 is in the regeneration state.

(3-1-1) First Single Operation Mode in Power Running State

The electrical power converter 33, which operates in the first single operation mode when the vehicle 1 is in the power running state, mainly functions as the boost chopper circuit for the first electrical source 31. As described above, the switching state of each of the switching elements S3 and S4 which is the lower arm for the first electrical source 31 is changed when the electrical power converter 33 is the boost chopper circuit for the first electrical source 31. Especially in the present embodiment, the switching state of each of the switching elements S3 and S4 which is the lower arm is changed in the below described manner.

Specifically, the switching state of one of two switching elements (namely, the switching elements S3 and S4) each of which is the lower arm is changed while the switching state of the other one of two switching elements each of which is the lower arm is kept (fixed). In other words, the switching states of two switching elements each of which is the lower arm do not change from the ON state to the OFF state (moreover, from the OFF state to the ON state) simultaneously.

It is preferable that the switching state of one of two switching elements each of which is the lower arm be changed while the switching state of the other one of two switching elements each of which is the lower arm be kept (fixed) in the ON state. For example, in the example illustrated in FIG. 3, the switching state of the switching element S3 is changed (namely, is changed from the ON state to the OFF state and then from the OFF state to the ON state) while the switching state of the switching element S4 is kept in the ON state. Namely, the switching element S4 is in the ON state during a period when the switching element S3 is in the OFF state. For example, in the example illustrated in FIG. 3, the switching state of the switching element S4 is changed while the switching state of the switching element S3 is kept in the ON state. Namely, the switching element S3 is in the ON state during a period when the switching element S4 is in the OFF state.

Moreover, in the present embodiment, it is preferable that the switching states of two switching elements each of which is the lower arm be changed alternately. Namely, it is preferable that the switching state of the switching element S3 be changed while the switching state of the switching element S4 be kept after the switching state of the switching element S4 be changed while the switching state of the switching element S3 be kept. Similarly, it is preferable that the switching state of the switching element S4 be changed while the switching state of the switching element S3 be kept after the switching state of the switching element S3 be changed while the switching state of the switching element S4 be kept. As a result, a difference between the number of the switching of the switching element S3 and the number of the switching of the switching element S4 becomes relatively small (preferably, substantially zero). Thus, an excessive heat generation of any one of the switching elements S3 and S4 is effectively prevented.

However, the switching states of two switching elements each of which is the lower arm may not be changed alternately. For example, a S3 switching operation and a S4 switching operation are performed in an arbitrary order, wherein the S3 switching operation changes the switching state of the switching element S3 while keeping the switching state of the switching element S4 and the S4 switching operation changes the switching state of the switching element S4 while keeping the switching state of the switching element S3. Specifically, the S4 switching operation may be performed X2 (X2 is an integer which is equal to or more than 1) times after the S3 switching operation is performed X1 (X1 is an integer which is equal to or more than 1) times. The S3 switching operation may be performed X4 (X4 is an integer which is equal to or more than 1) times after the S4 switching operation is performed X3 (X3 is an integer which is equal to or more than 1) times. The S3 switching operation may be performed and the S4 switching operation may not be performed. The S4 switching operation may be performed and the S3 switching operation may not be performed.

When both of the switching elements S3 and S4 are in the ON state, an electrical current path which is illustrated by an arrow in FIG. 4(a) is formed. As a result, the electrical power which is outputted from the first electrical source 31 is stored in the reactor L1.

On the other hand, when one of the switching elements S3 and S4 is in the OFF state, an electrical current path which is illustrated by an arrow in FIG. 4(b) is formed. As a result, the electrical power which is stored in the reactor L1 is supplied to the electrical source line PL via at least one portion of the switching elements S1 and S2 and the diodes D1 and D2. Namely, even when one of the switching elements S3 and S4 is in the OFF state, the electrical power which is stored in the reactor L1 is supplied to the electrical source line PL, as with the case where both of the switching elements S3 and S4 are in the OFF state. Incidentally, FIG. 4(b) illustrates an example of the electrical current path under a situation where the switching element S3 is in the OFF state and the switching element S4 is in the ON state. However, the electrical current which is same as the electrical current illustrated in FIG. 4(b) is formed even when the switching element S4 is in the OFF state and the switching element S3 is in the ON state.

Therefore, even when the switching state of one of the switching elements S3 and S4 each of which is the lower arm is changed while the switching state of the other one of the switching elements S3 and S4 is kept, the electrical power converter 33 is capable of functioning as the boost chopper circuit for the first electrical source 31.

The above described explanation explains the switching state of each of the switching elements S3 and S4 which is the lower arm under the situation where the electrical power converter 33 operates in the first single operation mode and the vehicle 1 is in the power running state. On the other hand, the switching state of each of the switching elements S1 and S2, which is the upper arm for the first electrical source 31 under the situation where the electrical power converter 33 operates in the first single operation mode and the vehicle 1 is in the power running state, may be any state. For example, the switching state of the switching element S1 may be kept in the ON state. For example, the switching state of the switching element S1 may be kept in the OFF state. For example, the switching state of the switching element S1 may be changed in a proper timing. For example, the switching state of the switching element S2 may be kept in the ON state. For example, the switching state of the switching element S2 may be kept in the OFF state. For example, the switching state of the switching element S2 may be changed in a proper timing. However, it is preferable that at least one of the switching elements S1 and S2 be in the OFF state when both of the switching elements S3 and S4 are in the ON state, in order to prevent a short circuit between the electrical source line PL and the ground line GL.

Moreover, it is preferable that the switching state of at least the switching element S1 which is the upper arm be kept in the OFF state, in order to prevent the electrical current from flowing from the second electrical source 32 to the electrical power converter 33 or from the electrical power converter 33 to the second electrical source 32.

(3-1-2) First Single Operation Mode in Regeneration State

The electrical power converter 33, which operates in the first single operation mode when the vehicle 1 is in the regeneration state, mainly functions as the step-down chopper circuit for the first electrical source 31. As described above, the switching state of each of the switching elements S1 and S2 which is the upper arm for the first electrical source 31 is changed when the electrical power converter 33 is the step-down chopper circuit for the first electrical source 31. Especially in the present embodiment, the switching state of each of the switching elements S1 and S2 which is the upper arm is changed in the below described manner.

Specifically, the switching state of one of two switching elements (namely, the switching elements S1 and S2) each of which is the upper arm is changed while the switching state of the other one of two switching elements each of which is the upper arm is kept (fixed). In other words, the switching states of two switching elements each of which is the upper arm do not change from the ON state to the OFF state (moreover, from the OFF state to the ON state) simultaneously.

It is preferable that the switching state of one of two switching elements each of which is the upper arm be changed while the switching state of the other one of two switching elements each of which is the upper arm be kept (fixed) in the ON state. For example, in the example illustrated in FIG. 5, the switching state of the switching element S1 is changed while the switching state of the switching element S2 is kept in the ON state. Namely, the switching element S2 is in the ON state during a period when the switching element S1 is in the OFF state. For example, in the example illustrated in FIG. 5, the switching state of the switching element S2 is changed while the switching state of the switching element S1 is kept in the ON state. Namely, the switching element S1 is in the ON state during a period when the switching element S2 is in the OFF state.

Moreover, in the present embodiment, it is preferable that the switching states of two switching elements each of which is the upper arm be changed alternately. Namely, it is preferable that the switching state of the switching element S1 be changed while the switching state of the switching element S2 be kept after the switching state of the switching element S2 be changed while the switching state of the switching element S1 be kept. Similarly, it is preferable that the switching state of the switching element S2 be changed while the switching state of the switching element S1 be kept after the switching state of the switching element S1 be changed while the switching state of the switching element S2 be kept. As a result, a difference between the number of the switching of the switching element S1 and the number of the switching of the switching element S2 becomes relatively small (preferably, substantially zero). Thus, an excessive heat generation of any one of the switching elements S1 and S2 is effectively prevented.

However, the switching states of two switching elements each of which is the upper arm may not be changed alternately. For example, a S1 switching operation and a S2 switching operation are performed in an arbitrary order, wherein the S1 switching operation changes the switching state of the switching element S1 while keeping the switching state of the switching element S2 and the S2 switching operation changes the switching state of the switching element S2 while keeping the switching state of the switching element S1. Specifically, the S2 switching operation may be performed X6 (X6 is an integer which is equal to or more than 1) times after the S1 switching operation is performed X5 (X5 is an integer which is equal to or more than 1) times. The S1 switching operation may be performed X8 (X8 is an integer which is equal to or more than 1) times after the S2 switching operation is performed X7 (X7 is an integer which is equal to or more than 1) times. The S1 switching operation may be performed and the S2 switching operation may not be performed. The S2 switching operation may be performed and the S1 switching operation may not be performed.

When both of the switching elements S1 and S2 are in the ON state, an electrical current path which is illustrated by an arrow in FIG. 6(a) is formed. As a result, the electrical power which is generated by the regeneration is stored in the reactor L1.

On the other hand, when one of the switching elements S1 and S2 is in the OFF state, an electrical current path which is illustrated by an arrow in FIG. 6(b) is formed. As a result, the electrical power which is stored in the reactor L1 is supplied to the ground line GL via at least one portion of the switching elements S3 and S4 and the diodes D3 and D4. Namely, even when one of the switching elements S1 and S2 is in the OFF state, the electrical power which is stored in the reactor L1 is supplied to the ground line GL, as with the case where both of the switching elements S1 and S2 are in the OFF state. Incidentally, FIG. 6(b) illustrates an example of the electrical current path under a situation where the switching element S1 is in the OFF state and the switching element S2 is in the ON state. However, the electrical current which is same as the electrical current illustrated in FIG. 6(b) is formed even when the switching element S2 is in the OFF state and the switching element S1 is in the ON state.

Therefore, even when the switching state of one of the switching elements S1 and S2 each of which is the upper arm is changed while the switching state of the other one of the switching elements S1 and S2 is kept, the electrical power converter 33 is capable of functioning as the step-down chopper circuit for the first electrical source 31.

The above described explanation explains the switching state of each of the switching elements S1 and S2 which is the upper arm under the situation where the electrical power converter 33 operates in the first single operation mode and the vehicle 1 is in the regeneration state. On the other hand, the switching state of each of the switching elements S3 and S4, which is the lower arm for the first electrical source 31 under the situation where the electrical power converter 33 operates in the first single operation mode and the vehicle 1 is in the regeneration state, may be any state, as with the case where the vehicle 1 is in the power running state. However, it is preferable that at least one of the switching elements S3 and S4 be in the OFF state when both of the switching elements S1 and S2 are in the ON state, in order to prevent the short circuit between the electrical source line PL and the ground line GL.

Moreover, it is preferable that the switching state of at least the switching element S4 which is the lower arm be kept in the OFF state, in order to prevent the electrical current from flowing from the second electrical source 32 to the electrical power converter 33 or from the electrical power converter 33 to the second electrical source 32.

(3-2) Second Single Operation Mode Using Second Electrical Source 32

Next, with reference to FIG. 7 to FIG. 10(a) and FIG. 10(b), an operation of the electrical power converter 33 in a second single operation mode, by which the electrical power converter 33 performs the electrical power conversion with the second electrical source 32, will be explained. FIG. 7 is a timing chart which illustrates a switching state of each of the switching elements S2 and S3 and an electrical current I(L2) which flows through the reactor L2 under a situation where the electrical power converter 33 operates in the second single operation mode and the vehicle 1 is in the power running state. Each of FIG. 8(a) and FIG. 8(b) is a circuit diagram which illustrates an electrical current path in the electrical power converter 33 under the situation where the electrical power converter 33 operates in the second single operation mode and the vehicle 1 is in the power running state. FIG. 9 is a timing chart which illustrates a switching state of each of the switching elements S1 and S4 and an electrical current I(L2) which flows through the reactor L2 under a situation where the electrical power converter 33 operates in the second single operation mode and the vehicle 1 is in the regeneration state. Each of FIG. 10(a) and FIG. 10(b) is a circuit diagram which illustrates an electrical current path in the electrical power converter 33 under the situation where the electrical power converter 33 operates in the second single operation mode and the vehicle 1 is in the regeneration state.

(3-2-1) Second Single Operation Mode in Power Running State

The electrical power converter 33, which operates in the second single operation mode when the vehicle 1 is in the power running state, mainly functions as the boost chopper circuit for the second electrical source 32. As described above, the switching state of each of the switching elements S2 and S3 which is the lower arm for the second electrical source 32 is changed when the electrical power converter 33 is the boost chopper circuit for the second electrical source 32. When the electrical power converter 33 operates in the second single operation mode, the switching state of one of two switching elements each of which is the lower arm is changed while the switching state of the other one of two switching elements each of which is the lower arm is kept (fixed), as with the case where the electrical power converter 33 operates in the first single operation mode.

For example, in the example illustrated in FIG. 7, the switching state of the switching element S2 is changed while the switching state of the switching element S3 is kept in the ON state. Namely, the switching element S3 is in the ON state during a period when the switching element S2 is in the OFF state. For example, in the example illustrated in FIG. 7, the switching state of the switching element S3 is changed while the switching state of the switching element S2 is kept in the ON state. Namely, the switching element S2 is in the ON state during a period when the switching element S3 is in the OFF state.

Moreover, it is preferable that the switching states of two switching elements each of which is the lower arm be changed alternately, in order to prevent an excessive heat generation of any one of two switching elements each of which is the lower arm. However, the switching states of two switching elements each of which is the lower arm may not be changed alternately. Its detailed explanation is omitted, because it is same as the above described explanation under the situation where the electrical power converter 33 operates in the first single operation mode.

When both of the switching elements S2 and S3 are in the ON state, an electrical current path which is illustrated by an arrow in FIG. 8(a) is formed. As a result, the electrical power which is outputted from the second electrical source 32 is stored in the reactor L2.

On the other hand, when one of the switching elements S2 and S3 is in the OFF state, an electrical current path which is illustrated by an arrow in FIG. 8(b) is formed. As a result, the electrical power which is stored in the reactor L2 is supplied to the electrical source line PL via at least one portion of the switching elements S1 and S4 and the diodes D1 and D4. Namely, even when one of the switching elements S2 and S3 is in the OFF state, the electrical power which is stored in the reactor L2 is supplied to the electrical source line PL, as with the case where both of the switching elements S2 and S3 are in the OFF state. Incidentally, FIG. 8(b) illustrates an example of the electrical current path under a situation where the switching element S2 is in the OFF state and the switching element S3 is in the ON state. However, the electrical current which is same as the electrical current illustrated in FIG. 8(b) is formed even when the switching element S3 is in the OFF state and the switching element S2 is in the ON state.

Therefore, even when the switching state of one of the switching elements S2 and S3 each of which is the lower arm is changed while the switching state of the other one of the switching elements S2 and S3 is kept, the electrical power converter 33 is capable of functioning as the boost chopper circuit for the second electrical source 32.

The above described explanation explains the switching state of each of the switching elements S2 and S3 which is the lower arm under the situation where the electrical power converter 33 operates in the second single operation mode and the vehicle 1 is in the power running state. On the other hand, the switching state of each of the switching elements S1 and S4 which is the upper arm for the second electrical source 32 may be any state, as with the case where the electrical power converter 33 operates in the first single operation mode. However, it is preferable that at least one of the switching elements S1 and S4 be in the OFF state when both of the switching elements S2 and S3 are in the ON state, in order to prevent the short circuit between the electrical source line PL and the ground line GL. Moreover, it is preferable that the switching state of at least the switching element S1 which is the upper arm be kept in the OFF state, in order to prevent the electrical current from flowing from the first electrical source 31 to the electrical power converter 33 or from the electrical power converter 33 to the first electrical source 31.

(3-2-2) Second Single Operation Mode in Regeneration State

The electrical power converter 33, which operates in the second single operation mode when the vehicle 1 is in the regeneration state, mainly functions as the step-down chopper circuit for the second electrical source 32. As described above, the switching state of each of the switching elements S1 and S4 which is the upper arm for the second electrical source 32 is changed when the electrical power converter 33 is the step-down chopper circuit for the second electrical source 32. When the electrical power converter 33 operates in the second single operation mode, the switching state of one of two switching elements each of which is the upper arm is changed while the switching state of the other one of two switching elements each of which is the upper arm is kept (fixed), as with the case where the electrical power converter 33 operates in the first single operation mode.

For example, in the example illustrated in FIG. 9, the switching state of the switching element S1 is changed while the switching state of the switching element S4 is kept in the ON state. Namely, the switching element S4 is in the ON state during a period when the switching element S1 is in the OFF state. For example, in the example illustrated in FIG. 9, the switching state of the switching element S4 is changed while the switching state of the switching element S1 is kept in the ON state. Namely, the switching element S1 is in the ON state during a period when the switching element S4 is in the OFF state.

Moreover, it is preferable that the switching states of two switching elements each of which is the upper arm be changed alternately, in order to prevent an excessive heat generation of any one of two switching elements each of which is the upper arm.

However, the switching states of two switching elements each of which is the upper arm may not be changed alternately. Its detailed explanation is omitted, because it is same as the above described explanation under the situation where the electrical power converter 33 operates in the first single operation mode.

When both of the switching elements S1 and S4 are in the ON state, an electrical current path which is illustrated by an arrow in FIG. 10(a) is formed. As a result, the electrical power which is generated by the regeneration is stored in the reactor L2.

On the other hand, when one of the switching elements S1 and S4 is in the OFF state, an electrical current path which is illustrated by an arrow in FIG. 10(b) is formed. As a result, the electrical power which is stored in the reactor L2 is supplied to the line to which the negative terminal of the second electrical source 32 is connected via at least one portion of the switching elements S2 and S3 and the diodes D2 and D3. Namely, even when one of the switching elements S1 and S4 is in the OFF state, the electrical power which is stored in the reactor L2 is supplied, as with the case where both of the switching elements S1 and S4 are in the OFF state. Incidentally, FIG. 10(b) illustrates an example of the electrical current path under a situation where the switching element S1 is in the OFF state and the switching element S4 is in the ON state. However, the electrical current which is same as the electrical current illustrated in FIG. 10(b) is formed even when the switching element S4 is in the OFF state and the switching element S1 is in the ON state.

Therefore, even when the switching state of one of the switching elements S1 and S4 each of which is the upper arm is changed while the switching state of the other one of the switching elements S1 and S4 is kept, the electrical power converter 33 is capable of functioning as the step-down chopper circuit for the second electrical source 32.

The above described explanation explains the switching state of each of the switching elements S1 and S4 which is the upper arm under the situation where the electrical power converter 33 operates in the second single operation mode and the vehicle 1 is in the regeneration state. On the other hand, the switching state of each of the switching elements S2 and S3 which is the lower arm for the second electrical source 32 may be any state, as with the case where the electrical power converter 33 operates in the first single operation mode. However, it is preferable that at least one of the switching elements S2 and S3 be in the OFF state when both of the switching elements S1 and S4 are in the ON state, in order to prevent the short circuit between the electrical source line PL and the ground line GL. Moreover, it is preferable that the switching state of at least the switching element S2 which is the lower arm be kept in the OFF state, in order to prevent the electrical current from flowing from the first electrical source 31 to the electrical power converter 33 or from the electrical power converter 33 to the first electrical source 31.

(3-3) Technical Effect

Next, with reference to FIG. 11(a) and FIG. 11(b), a technical effect of the electrical source system 30 of the present embodiment will be explained. Each of FIG. 11(a) and FIG. 11(b) is a timing chart which illustrates the switching states of the switching elements S1 to S4 of an electrical source system in a comparative example in which the switching states of two switching elements each of which is the upper arm or the lower arm are changed simultaneously.

As illustrated in FIG. 11 (a), in the comparative example, the switching states of two switching elements each of which is the lower arm are changed simultaneously, when the vehicle 1 is in the power running state. For example, in the comparative example, the switching states of the switching elements S3 and S4 each of which is the lower arm are changed simultaneously, when the electrical power converter 33 operates in the first single operation mode and the vehicle 1 is in the power running state. For example, in the comparative example, the switching states of the switching elements S2 and S3 each of which is the lower arm are changed simultaneously, when the electrical power converter 33 operates in the second single operation mode and the vehicle 1 is in the power running state.

On the other hand, in the present embodiment, the switching state of one of two switching elements each of which is the lower arm is changed while the switching state of the other one of two switching elements each of which is the lower arm is kept, when the vehicle 1 is in the power running state. Thus, the number of the switching of each of two switching elements which is the lower arm is reduced (reduced by half) compared to the number of the switching of each switching element in the comparative example. Therefore, a switching loss in the electrical power converter 33 is also reduced due to the reduction of the number of the switching.

As illustrated in FIG. 11 (b), in the comparative example, the switching states of two switching elements each of which is the upper arm are changed simultaneously, when the vehicle 1 is in the regeneration state. For example, in the comparative example, the switching states of the switching elements S1 and S2 each of which is the upper arm are changed simultaneously, when the electrical power converter 33 operates in the first single operation mode and the vehicle 1 is in the regeneration state. For example, in the comparative example, the switching states of the switching elements S1 and S4 each of which is the upper arm are changed simultaneously, when the electrical power converter 33 operates in the second single operation mode and the vehicle 1 is in the regeneration state.

On the other hand, in the present embodiment, the switching state of one of two switching elements each of which is the upper arm is changed while the switching state of the other one of two switching elements each of which is the upper arm is kept, when the vehicle 1 is in the regeneration state. Thus, the number of the switching of each of two switching elements which is the upper arm is reduced (reduced by half) compared to the number of the switching of each switching element in the comparative example. Therefore, the switching loss in the electrical power converter 33 is also reduced due to the reduction of the number of the switching.

Especially in the present embodiment, the reduction of the number of the switching results in the reduction of the switching loss. Namely, the switching loss is reduced without using cancellation of an electrical current which flows through the first electrical source 31 and an electrical current which flows through the second electrical source on at least one of the switching elements S1 to S4. On the other hand, an invention disclosed in the Patent Literature 1 reduces the switching loss by using the cancellation of the electrical current which flows through the first electrical source 31 and the electrical current which flows through the second electrical source on at least one of the switching elements S1 to S4. Thus, there is a possibility that the switching loss is not reduced by the invention disclosed in the Patent Literature 1 when the electrical power converter 33 operates in the single operation mode. However, in the present embodiment, the switching loss is effectively reduced even when the electrical power converter 33 operates in the single operation mode.

(4) Modified Example

Next, with reference to FIG. 12 to FIG. 20, an electrical source system 30a in a modified example will be explained. The electrical source system 30a in the modified example is different from the above described electrical source system 30 in that at least one portion of the structure and the operation of an electrical power converter 33a is different from those of the above described electrical power converter 33. Therefore, in the below described explanation, the structure and the operation of the electrical power converter 33a in the modified example will be explained.

(4-1) Circuit Structure of Electrical Power Converter

Firstly, with reference to FIG. 12, the circuit structure of the electrical power converter 33a in the modified example will be explained. FIG. 12 is a circuit diagram illustrating the circuit structure of the electrical power converter 33a in the modified example.

As illustrated in FIG. 12, the electrical power converter 33a in the modified example is different from the above described electrical power converter 33 in that the electrical power converter 33a further has a first relay (SMR: System Main Relay) R1, a second relay R2, a first filter condenser C1 and a second filter condenser C2. The other components of the electrical power converter 33a may be same as those of the above described electrical power converter 33.

The first relay R1 is electrically connected in series with the first electrical source 31 and the reactor L1 between the first electrical source 31 and the reactor L1. The first relay R1 changes a state thereof from an ON state to an OFF state or the OFF state to the ON state under the control of the PCU 36. The first electrical source 31 is electrically connected to the electrical power converter 33 when the first relay R1 is in the ON state. The first electrical source 31 is electrically insulated from the electrical power converter 33 when the first relay R1 is in the OFF state.

The second relay R2 is electrically connected in series with the second electrical source 32 and the reactor L2 between the second electrical source 32 and the reactor L2. The second relay R2 changes a state thereof from the ON state to the OFF state or the OFF state to the ON state under the control of the PCU 36.

The second electrical source 32 is electrically connected to the electrical power converter 33 when the second relay R2 is in the ON state. The second electrical source 32 is electrically insulated from the electrical power converter 33 when the second relay R2 is in the OFF state.

The first filter condenser C1 is electrically connected in parallel with the first electrical source 31 between the first electrical source 31 and the reactor L1. The first filter condenser C1 mainly suppress a fluctuation of an electrical voltage between the positive and negative terminals of the first electrical source 31 which is caused by the change of the switching states of the switching elements S1 to S4.

The second filter condenser C2 is electrically connected in parallel with the second electrical source 32 between the second electrical source 32 and the reactor L2. The second filter condenser C2 mainly suppress a fluctuation of an electrical voltage between the positive and negative terminals of the second electrical source 32 which is caused by the change of the switching states of the switching elements S1 to S4.

There is a possibility that the second filter condenser C2 is unnecessarily charged when the electrical power converter 33 operates in the first single operation mode by which the electrical power converter 33 performs the electrical power conversion with the first electrical source 31. There is a possibility that the first filter condenser C1 is unnecessarily charged when the electrical power converter 33 operates in the second single operation mode by which the electrical power converter 33 performs the electrical power conversion with the second electrical source 32. In the modified example, the switching state of each of the switching elements S1 to S4 is changed in the below described manner, in order to suppress or prevent the unnecessary charge of at least one of the first filter condenser C1 and the second filter condenser C2. Hereinafter, an operation of changing the switching state of each of the switching elements S1 to S4, which is modified to suppress or prevent the unnecessary charge of at least one of the first filter condenser C1 and the second filter condenser C2, will be explained.

(4-2) Operation of Electrical Power Converter in Modified Example

Next, with reference to FIG. 13(a) and FIG. 13(b) to FIG. 20, an operation of the electrical power converter 33a in the modified example which is performed under the control of the PCU 36 will be explained. Hereinafter, first to eighth examples of the modified operation of the electrical power converter 33a will be explained. The electrical power converter 33a may perform all of the first to eighth examples of the modified operation. However, the electrical power converter 33a may perform one portion of the first to eighth examples of the modified operation and may not perform the other portion of the first to eighth examples of the modified operation.

(4-2-1) First Example of Modified Operation—the First Electrical Source 31 is Used, the Second Relay R2 is in the OFF State and the Vehicle 1 is in the Power Running State Firstly, with reference to FIG. 13(a) and FIG. 13(b), a first example of the modified operation, in which the electrical power converter 33a operates in the first single operation mode under a situation where the second relay R2 is in the OFF state (moreover, the first relay R1 is in the ON state) and the vehicle 1 is in the power running state. Each of FIG. 13(a) and FIG. 13(b) is a table which illustrates the switching states of the switching elements S1 to S4 in the first example of the modified operation in which the electrical power converter 33a operates in the first single operation mode under the situation where the second relay R2 is in the OFF state (moreover, the first relay R1 is in the ON state) and the vehicle 1 is in the power running state.

Also in the first example of the modified operation, the switching state of one of two switching elements each of which is the lower arm for the first electrical source 31 is changed while the switching state of the other one of two switching elements each of which is the lower arm is kept, as described above. Specifically, as illustrated in FIG. 13(a), the switching state of the switching element S4 is changed while the switching state of the switching element S3 is kept in the ON state. The electrical power which is outputted from the first electrical source 31 is stored in the reactor L1 (namely, the reactor L1 is charged), when the switching element S4 is in the ON state. The electrical power which is stored in the reactor L1 is supplied (namely, the reactor L1 discharges), when the switching element S4 is in the OFF state. Therefore, the switching loss of the switching element S3 is reduced while the electrical power converter 33a functions as the boost chopper circuit for the first electrical source 31.

In addition, in the first example of the modified example, as illustrated in FIG. 13(a), the switching state of the switching element S2 is kept in the ON state. Namely, in the first example of the modified example, the switching state of each of the switching elements S2 and S3 is kept in the ON state. In this case, as illustrated in the circuit diagram of FIG. 12, both terminals of the second filter condenser C2 short-circuits. Therefore, the unnecessary charge of the second filter condenser C2 is effectively suppressed or prevented.

In addition, in the first example of the modified example, the switching state of the switching element S1 and the switching state of the switching element S3 has an inverted relationship, in order to prevent the short circuit in the electrical power converter 33a which is caused by all of the switching states of the switching elements S1 to S4 being in the ON state. Namely, as illustrated in FIG. 13(a), in the first example of the modified operation, since the switching state of the switching element S3 is kept in the ON state, the switching state of the switching element S1 is kept in the OFF state. As a result, the switching loss of the switching element S1 is reduced while the short circuit in the electrical power converter 33a is prevented. Incidentally, as described above, the switching element S1 whose switching state is kept in the OFF state is capable of preventing the electrical current from flowing from the second electrical source 32 to the electrical power converter 33a or from the electrical power converter 33a to the second electrical source 32.

On the other hand, there is a possibility that the excessive heat generation of the switching element S4 occurs when the switching state of the switching element S4 is changed while the switching state of the switching element S3 is kept in the ON state. Thus, in the first example of the modified operation, the electrical power converter 33a may perform in the manner illustrated in FIG. 13(b) in addition to or instead of the manner illustrated in FIG. 13(a) when a temperature of the switching element S4 is relatively high (for example, is higher than a predetermined threshold value), in order to prevent the excessive heat generation of the switching element S4. Specifically, as illustrated in FIG. 13(b), the switching state of the switching element S3 may be changed while the switching state of the switching element S4 may be kept in the ON state. Therefore, the switching loss of the switching element S4 is reduced (namely, the heat generation of the switching element S4 is suppressed) while the electrical power converter 33a functions as the boost chopper circuit for the first electrical source 31. Moreover, as illustrated in FIG. 13(b), the switching state of the switching element S1 may be kept in the OFF state regardless of the switching state of the switching element S3. Therefore, the switching loss of the switching element S1 is reduced while the short circuit in the electrical power converter 33a is prevented. Moreover, as illustrated in FIG. 13(b), the switching state of the switching element S2 may be kept in the ON state. In this case, although the switching element S2 whose switching state is kept in the ON state does not always result in the short circuit of both terminals of the second filter condenser C2, the switching loss of the switching element S2 is reduced.

(4-2-2) Second Example of Modified Operation—the First Electrical Source 31 is Used, the Second Relay R2 is in the OFF State and the Vehicle 1 is in the Regeneration State Next, with reference to FIG. 14(a) and FIG. 14(b), a second example of the modified operation, in which the electrical power converter 33a operates in the first single operation mode under a situation where the second relay R2 is in the OFF state (moreover, the first relay R1 is in the ON state) and the vehicle 1 is in the regeneration state. Each of FIG. 14(a) and FIG. 14(b) is a table which illustrates the switching states of the switching elements S1 to S4 in the second example of the modified operation in which the electrical power converter 33a operates in the first single operation mode under the situation where the second relay R2 is in the OFF state (moreover, the first relay R1 is in the ON state) and the vehicle 1 is in the regeneration state.

Also in the second example of the modified operation, the switching state of one of two switching elements each of which is the upper arm for the first electrical source 31 is changed while the switching state of the other one of two switching elements each of which is the upper arm is kept, as described above. Specifically, as illustrated in FIG. 14(a), the switching state of the switching element S1 is changed while the switching state of the switching element S2 is kept in the ON state. The electrical power which is generated by the regeneration is stored in the reactor L1 (namely, the reactor L1 is charged), when the switching element S1 is in the ON state. The electrical power which is stored in the reactor L1 is supplied (namely, the reactor L1 discharges), when the switching element S1 is in the OFF state. Therefore, the switching loss of the switching element S2 is reduced while the electrical power converter 33a functions as the step-down chopper circuit for the first electrical source 31.

In addition, in the second example of the modified example, as illustrated in FIG. 14(a), the switching state of the switching element S3 is kept in the ON state. Namely, in the second example of the modified example, the switching state of each of the switching elements S2 and S3 is kept in the ON state. In this case, as illustrated in the circuit diagram of FIG. 12, both terminals of the second filter condenser C2 short-circuits. Therefore, the unnecessary charge of the second filter condenser C2 is effectively suppressed or prevented.

In addition, in the second example of the modified example, the switching state of the switching element S4 and the switching state of the switching element S2 has an inverted relationship, in order to prevent the short circuit in the electrical power converter 33a which is caused by all of the switching states of the switching elements S1 to S4 being in the ON state. Namely, as illustrated in FIG. 14(a), in the second example of the modified operation, since the switching state of the switching element S2 is kept in the ON state, the switching state of the switching element S4 is kept in the OFF state. As a result, the switching loss of the switching element S4 is reduced while the short circuit in the electrical power converter 33a is prevented. Incidentally, as described above, the switching element S4 whose switching state is kept in the OFF state is capable of preventing the electrical current from flowing from the second electrical source 32 to the electrical power converter 33a or from the electrical power converter 33a to the second electrical source 32.

On the other hand, there is a possibility that the excessive heat generation of the switching element S1 occurs when the switching state of the switching element S1 is changed while the switching state of the switching element S2 is kept in the ON state. Thus, in the second example of the modified operation, the electrical power converter 33a may perform in the manner illustrated in FIG. 14(b) in addition to or instead of the manner illustrated in FIG. 14(a) when a temperature of the switching element S1 is relatively high (for example, is higher than a predetermined threshold value), in order to prevent the excessive heat generation of the switching element S1. Specifically, as illustrated in FIG. 14(b), the switching state of the switching element S2 may be changed while the switching state of the switching element S1 may be kept in the ON state. Therefore, the switching loss of the switching element S1 is reduced (namely, the heat generation of the switching element S1 is suppressed) while the electrical power converter 33a functions as the step-down chopper circuit for the first electrical source 31. Moreover, as illustrated in FIG. 14(b), the switching state of the switching element S4 may be kept in the OFF state regardless of the switching state of the switching element S2. Therefore, the switching loss of the switching element S4 is reduced while the short circuit in the electrical power converter 33a is prevented. Moreover, as illustrated in FIG. 14(b), the switching state of the switching element S3 may be kept in the ON state. In this case, although the switching element S3 whose switching state is kept in the ON state does not always result in the short circuit of both terminals of the second filter condenser C2, the switching loss of the switching element S3 is reduced.

(4-2-3) Third Example of Modified Operation—the Second Electrical Source 32 is Used, the First Relay R1 is in the OFF State and the Vehicle 1 is in the Power Running State Next, with reference to FIG. 15(a) and FIG. 15(b), a third example of the modified operation, in which the electrical power converter 33a operates in the second single operation mode under a situation where the first relay R1 is in the OFF state (moreover, the second relay R2 is in the ON state) and the vehicle 1 is in the power running state. Each of FIG. 15(a) and FIG. 15(b) is a table which illustrates the switching states of the switching elements S1 to S4 in the third example of the modified operation in which the electrical power converter 33a operates in the second single operation mode under the situation where the first relay R1 is in the OFF state (moreover, the second relay R2 is in the ON state) and the vehicle 1 is in the power running state.

Also in the third example of the modified operation, the switching state of one of two switching elements each of which is the lower arm for the second electrical source 32 is changed while the switching state of the other one of two switching elements each of which is the lower arm is kept, as described above. Specifically, as illustrated in FIG. 15(a), the switching state of the switching element S2 is changed while the switching state of the switching element S3 is kept in the ON state. The electrical power which is outputted from the second electrical source 32 is stored in the reactor L2 (namely, the reactor L2 is charged), when the switching element S2 is in the ON state. The electrical power which is stored in the reactor L2 is supplied (namely, the reactor L2 discharges), when the switching element S2 is in the OFF state. Therefore, the switching loss of the switching element S3 is reduced while the electrical power converter 33a functions as the boost chopper circuit for the second electrical source 32.

In addition, in the third example of the modified example, as illustrated in FIG. 15(a), the switching state of the switching element S4 is kept in the ON state. Namely, in the third example of the modified example, the switching state of each of the switching elements S3 and S4 is kept in the ON state. In this case, as illustrated in the circuit diagram of FIG. 12, both terminals of the first filter condenser C1 short-circuits. Therefore, the unnecessary charge of the first filter condenser C1 is effectively suppressed or prevented.

In addition, in the third example of the modified example, the switching state of the switching element S1 and the switching state of the switching element S3 has an inverted relationship, in order to prevent the short circuit in the electrical power converter 33a which is caused by all of the switching states of the switching elements S1 to S4 being in the ON state. Namely, as illustrated in FIG. 15(a), in the third example of the modified operation, since the switching state of the switching element S3 is kept in the ON state, the switching state of the switching element S1 is kept in the OFF state. As a result, the switching loss of the switching element S1 is reduced while the short circuit in the electrical power converter 33a is prevented. Incidentally, as described above, the switching element S1 whose switching state is kept in the OFF state is capable of preventing the electrical current from flowing from the first electrical source 31 to the electrical power converter 33a or from the electrical power converter 33a to the first electrical source 31.

On the other hand, there is a possibility that the excessive heat generation of the switching element S2 occurs when the switching state of the switching element S2 is changed while the switching state of the switching element S3 is kept in the ON state. Thus, in the third example of the modified operation, the electrical power converter 33a may perform in the manner illustrated in FIG. 15(b) in addition to or instead of the manner illustrated in FIG. 15(a) when a temperature of the switching element S2 is relatively high (for example, is higher than a predetermined threshold value), in order to prevent the excessive heat generation of the switching element S2. Specifically, as illustrated in FIG. 15(b), the switching state of the switching element S3 may be changed while the switching state of the switching element S2 may be kept in the ON state. Therefore, the switching loss of the switching element S2 is reduced (namely, the heat generation of the switching element S2 is suppressed) while the electrical power converter 33a functions as the boost chopper circuit for the second electrical source 32. Moreover, as illustrated in FIG. 15(b), the switching state of the switching element S1 may be kept in the OFF state regardless of the switching state of the switching element S3. Therefore, the switching loss of the switching element S1 is reduced while the short circuit in the electrical power converter 33a is prevented. Moreover, as illustrated in FIG. 15(b), the switching state of the switching element S4 may be kept in the ON state. In this case, although the switching element S4 whose switching state is kept in the ON state does not always result in the short circuit of both terminals of the first filter condenser C1, the switching loss of the switching element S4 is reduced.

(4-2-4) Fourth Example of Modified Operation—the Second Electrical Source 32 is Used, the First Relay R1 is in the OFF State and the Vehicle 1 is in the Regeneration State Next, with reference to FIG. 16(a) and FIG. 16(b), a fourth example of the modified operation, in which the electrical power converter 33a operates in the second single operation mode under a situation where the first relay R1 is in the OFF state (moreover, the second relay R2 is in the ON state) and the vehicle 1 is in the regeneration state. Each of FIG. 16(a) and FIG. 16(b) is a table which illustrates the switching states of the switching elements S1 to S4 in the fourth example of the modified operation in which the electrical power converter 33a operates in the second single operation mode under the situation where the first relay R1 is in the OFF state (moreover, the second relay R2 is in the ON state) and the vehicle 1 is in the regeneration state.

Also in the fourth example of the modified operation, the switching state of one of two switching elements each of which is the upper arm for the second electrical source 32 is changed while the switching state of the other one of two switching elements each of which is the upper arm is kept, as described above. Specifically, as illustrated in FIG. 16(a), the switching state of the switching element S1 is changed while the switching state of the switching element S4 is kept in the ON state. The electrical power which is generated by the regeneration is stored in the reactor L2 (namely, the reactor L2 is charged), when the switching element S1 is in the ON state. The electrical power which is stored in the reactor L2 is supplied (namely, the reactor L2 discharges), when the switching element S1 is in the OFF state. Therefore, the switching loss of the switching element S4 is reduced while the electrical power converter 33a functions as the step-down chopper circuit for the second electrical source 32.

In addition, in the fourth example of the modified example, as illustrated in FIG. 16(a), the switching state of the switching element S3 is kept in the ON state. Namely, in the fourth example of the modified example, the switching state of each of the switching elements S3 and S4 is kept in the ON state. In this case, as illustrated in the circuit diagram of FIG. 12, both terminals of the first filter condenser C1 short-circuits. Therefore, the unnecessary charge of the first filter condenser C1 is effectively suppressed or prevented.

In addition, in the fourth example of the modified example, the switching state of the switching element S2 and the switching state of the switching element S4 has an inverted relationship, in order to prevent the short circuit in the electrical power converter 33a which is caused by all of the switching states of the switching elements S1 to S4 being in the ON state. Namely, as illustrated in FIG. 16(a), in the fourth example of the modified operation, since the switching state of the switching element S4 is kept in the ON state, the switching state of the switching element S2 is kept in the OFF state. As a result, the switching loss of the switching element S2 is reduced while the short circuit in the electrical power converter 33a is prevented. Incidentally, as described above, the switching element S2 whose switching state is kept in the OFF state is capable of preventing the electrical current from flowing from the first electrical source 31 to the electrical power converter 33a or from the electrical power converter 33a to the first electrical source 31.

On the other hand, there is a possibility that the excessive heat generation of the switching element S1 occurs when the switching state of the switching element S1 is changed while the switching state of the switching element S4 is kept in the ON state. Thus, in the fourth example of the modified operation, the electrical power converter 33a may perform in the manner illustrated in FIG. 16(b) in addition to or instead of the manner illustrated in FIG. 16(a) when a temperature of the switching element S1 is relatively high (for example, is higher than a predetermined threshold value), in order to prevent the excessive heat generation of the switching element S1. Specifically, as illustrated in FIG. 16(b), the switching state of the switching element S4 may be changed while the switching state of the switching element S1 may be kept in the ON state. Therefore, the switching loss of the switching element S1 is reduced (namely, the heat generation of the switching element S1 is suppressed) while the electrical power converter 33a functions as the step-down chopper circuit for the second electrical source 32. Moreover, as illustrated in FIG. 16(b), the switching state of the switching element S2 may be kept in the OFF state regardless of the switching state of the switching element S4. Therefore, the switching loss of the switching element S2 is reduced while the short circuit in the electrical power converter 33a is prevented. Moreover, as illustrated in FIG. 16(b), the switching state of the switching element S3 may be kept in the ON state. In this case, although the switching element S3 whose switching state is kept in the ON state does not always result in the short circuit of both terminals of the first filter condenser C1, the switching loss of the switching element S3 is reduced.

(4-2-5) Fifth Example of Modified Operation—the First Electrical Source 31 is Used, the Second Relay R2 is in the ON State and the Vehicle 1 is in the Power Running State Next, with reference to FIG. 17, a fifth example of the modified operation, in which the electrical power converter 33a operates in the first single operation mode under a situation where the second relay R2 is in the ON state (moreover, the first relay R1 is in the ON state) and the vehicle 1 is in the power running state. FIG. 17 is a table which illustrates the switching states of the switching elements S1 to S4 in the fifth example of the modified operation in which the electrical power converter 33a operates in the first single operation mode under the situation where the second relay R2 is in the ON state (moreover, the first relay R1 is in the ON state) and the vehicle 1 is in the power running state.

Also in the fifth example of the modified operation, the switching state of one of two switching elements each of which is the lower arm for the first electrical source 31 is changed while the switching state of the other one of two switching elements each of which is the lower arm is kept, as described above.

Specifically, as illustrated in FIG. 17, the switching state of the switching element S4 is changed while the switching state of the switching element S3 is kept in the ON state even in the fifth example of the modified operation, as with the first example of the modified operation (see the switching states in the "L1 CHARGE #1" and the "L1 DISCHARGE #1"). Therefore, the switching loss of the switching element S3 is reduced while the electrical power converter 33a functions as the boost chopper circuit for the first electrical source 31.

On the other hand, as illustrated in FIG. 17, the switching state of the switching element S3 may be changed while the switching state of the switching element S4 may be kept in the ON state (see the switching states in the "L1 CHARGE #1" and the "L1 DISCHARGE #1"), when an electrical voltage V1 between both terminals of the lower arms for the first electrical source 31 (namely, an electrical voltage V1 between the ground line PL and the node N2) is equal to or smaller than an electrical voltage V2 between both terminals of the lower arms for the second electrical source 32 (namely, an electrical voltage V2 between the node N1 and the node N3). The electrical power which is outputted from the first electrical source 31 is stored in the reactor L1 (namely, the reactor L1 is charged), when the switching element S3 is in the ON state. The electrical power which is stored in the reactor L1 is supplied (namely, the reactor L1 discharges), when the switching element S3 is in the OFF state. Therefore, the switching loss of the switching element S4 is reduced while the electrical power converter 33a functions as the boost chopper circuit for the first electrical source 31.

On the other hand, it is preferable that the operation in which the switching state of the switching element S3 is changed while the switching state of the switching element S4 is kept in the ON state not be performed, when the electrical voltage V1 is larger than the electrical voltage V2 (see an operating condition in the "L1 CHARGE #2" and the "L1 DISCHARGE #2"). In other words, it is preferable that a situation where the switching elements S1 to S3 are in the OFF state and the switching element S4 is in the ON state not arise, when the electrical voltage V1 is larger than the electrical voltage V2. One reason is to prevent a charge between sources by which the electrical current flows from the first electrical source 31 to the second electrical source 32 (namely, the second electrical source 32 is charged by the first electrical source 31), wherein the charge between sources arises when the switching state of the switching element S3 is changed while the switching state of the switching element S4 is kept in the ON state under the situation where the electrical voltage V1 is larger than the electrical voltage V2. However, when the charge between sources is allowed, the switching state of the switching element S3 may be changed while the switching state of the switching element S4 may be kept in the ON state even under the situation where the electrical voltage V1 is larger than the electrical voltage V2 (see the operating condition in the "L1 CHARGE #2" and the "L1 DISCHARGE #2").

In addition, in the fifth example of the modified example, as illustrated in FIG. 17, the switching state of each of the switching elements S1 and S2 is kept in the OFF state. Therefore, the switching loss of each of the switching elements S1 and S2 is reduced.

(4-2-6) Sixth Example of Modified Operation—the First Electrical Source 31 is Used, the Second Relay R2 is in the ON State and the Vehicle 1 is in the Regeneration State Next, with reference to FIG. 18, a sixth example of the modified operation, in which the electrical power converter 33a operates in the first single operation mode under a situation where the second relay R2 is in the ON state (moreover, the first relay R1 is in the ON state) and the vehicle 1 is in the regeneration state. FIG. 18 is a table which illustrates the switching states of the switching elements S1 to S4 in the sixth example of the modified operation in which the electrical power converter 33a operates in the first single operation mode under the situation where the second relay R2 is in the ON state (moreover, the first relay R1 is in the ON state) and the vehicle 1 is in the regeneration state.

Also in the sixth example of the modified operation, the switching state of one of two switching elements each of which is the upper arm for the first electrical source 31 is changed while the switching state of the other one of two switching elements each of which is the upper arm is kept, as described above.

Specifically, as illustrated in FIG. 18, the switching state of the switching element S2 is changed while the switching state of the switching element S1 is kept in the ON state (see the switching states in the "L1 CHARGE #1" and the "L1 DISCHARGE #1"). The electrical power which is generated by the regeneration is stored in the reactor L1 (namely, the reactor L1 is charged), when the switching element S2 is in the ON state. The electrical power which is stored in the reactor L1 is supplied (namely, the reactor L1 discharges), when the switching element S2 is in the OFF state. Therefore, the switching loss of the switching element S1 is reduced while the electrical power converter 33a functions as the step-down chopper circuit for the first electrical source 31.

However, the operation in which the switching state of the switching element S2 is changed while the switching state of the switching element S1 is kept in the ON state is preferably performed when the electrical voltage V1 is equal to or larger than the electrical voltage V2 (see an operating condition in the "L1 CHARGE #1" and the "L1 DISCHARGE #1"). In other words, it is preferable that the operation in which the switching state of the switching element S2 is changed while the switching state of the switching element S1 is kept in the ON state not performed when the electrical voltage V1 is smaller than the electrical voltage V2. In other words, it is preferable that a situation where the switching elements S1 and S2 are in the ON state and the switching elements S3 and S4 is in the OFF state not arise, when the electrical voltage V1 is smaller than the electrical voltage V2. One reason is to prevent the charge between sources by which the electrical current flows from the second electrical source 32 to the first electrical source 31 (namely, the first electrical source 31 is charged by the second electrical source 32), wherein the charge between sources arises when the switching state of the switching element S2 is changed while the switching state of the switching element S1 is kept in the ON state under the situation where the electrical voltage V1 is smaller than the electrical voltage V2. However, when the charge between sources is allowed, the switching state of the switching element S2 may be changed while the switching state of the switching element S1 may be kept in the ON state even under the situation where the electrical voltage V1 is smaller than the electrical voltage V2 (see the operating condition in the "L1 CHARGE #1" and the "L1 DISCHARGE #1").

On the other hand, as illustrated in FIG. 18, the switching state of the switching element S1 may be changed while the switching state of the switching element S2 may be kept in the ON state, when the electrical voltage V1 is equal to or larger than the electrical voltage V2, even in the sixth example of the modified operation, as with the second example of the modified operation (see the operating condition in the "L1 CHARGE #2" and the "L1 DISCHARGE #2"). Therefore, the switching loss of the switching element S2 is reduced while the electrical power converter 33a functions as the step-down chopper circuit for the first electrical source 31.

On the other hand, it is preferable that the operation in which the switching state of the switching element S1 is changed while the switching state of the switching element S2 is kept in the ON state not be performed, when the electrical voltage V1 is smaller than the electrical voltage V2 (see an operating condition in the "L1 CHARGE #2" and the "L1 DISCHARGE #2"). In other words, it is preferable that a situation where the switching elements S1 and S3 to S4 are in the OFF state and the switching element S2 is in the ON state not arise, when the electrical voltage V1 is smaller than the electrical voltage V2. One reason is to prevent the charge between sources by which the electrical current flows from the second electrical source 32 to the first electrical source 31 (namely, the first electrical source 31 is charged by the second electrical source 32), wherein the charge between sources arises when the switching state of the switching element S1 is changed while the switching state of the switching element S2 is kept in the ON state under the situation where the electrical voltage V1 is smaller than the electrical voltage V2. However, when the charge between sources is allowed, the switching state of the switching element S1 may be changed while the switching state of the switching element S2 may be kept in the ON state even under the situation where the electrical voltage V1 is smaller than the electrical voltage V2 (see the operating condition in the "L1 CHARGE #2" and the "L1 DISCHARGE #2").

In addition, in the sixth example of the modified example, as illustrated in FIG. 18, the switching state of each of the switching elements S3 and S4 is kept in the OFF state. Therefore, the switching loss of each of the switching elements S3 and S4 is reduced.

(4-2-7) Seventh Example of Modified Operation—the Second Electrical Source 32 is Used, the First Relay R1 is in the ON State and the Vehicle 1 is in the Power Running State Next, with reference to FIG. 19, a seventh example of the modified operation, in which the electrical power converter 33a operates in the second single operation mode under a situation where the first relay R1 is in the ON state (moreover, the second relay R1 is in the ON state) and the vehicle 1 is in the power running state. FIG. 19 is a table which illustrates the switching states of the switching elements S1 to S4 in the seventh example of the modified operation in which the electrical power converter 33a operates in the second single operation mode under the situation where the first relay R1 is in the ON state (moreover, the second relay R2 is in the ON state) and the vehicle 1 is in the power running state.

Also in the seventh example of the modified operation, the switching state of one of two switching elements each of which is the lower arm for the second electrical source 32 is changed while the switching state of the other one of two switching elements each of which is the lower arm is kept, as described above.

Specifically, as illustrated in FIG. 19, the switching state of the switching element S2 is changed while the switching state of the switching element S3 is kept in the ON state even in the seventh example of the modified operation, as with the third example of the modified operation (see the switching states in the "L2 CHARGE #1" and the "L2 DISCHARGE #1"). Therefore, the switching loss of the switching element S3 is reduced while the electrical power converter 33a functions as the boost chopper circuit for the second electrical source 32.

On the other hand, as illustrated in FIG. 19, the switching state of the switching element S3 may be changed while the switching state of the switching element S2 may be kept in the ON state (see the switching states in the "L2 CHARGE #2" and the "L2 DISCHARGE #2"), when the electrical voltage V1 is equal to or larger than the electrical voltage V2. The electrical power which is outputted from the second electrical source 32 is stored in the reactor L2 (namely, the reactor L2 is charged), when the switching element S3 is in the ON state. The electrical power which is stored in the reactor L2 is supplied (namely, the reactor L2 discharges), when the switching element S3 is in the OFF state. Therefore, the switching loss of the switching element S2 is reduced while the electrical power converter 33a functions as the boost chopper circuit for the second electrical source 31.

On the other hand, it is preferable that the operation in which the switching state of the switching element S3 is changed while the switching state of the switching element S2 is kept in the ON state not be performed, when the electrical voltage V1 is smaller than the electrical voltage V2 (see an operating condition in the "L2 CHARGE #2" and the "L2 DISCHARGE #2"). In other words, it is preferable that a situation where the switching elements S1 and S3 to S4 are in the OFF state and the switching element S2 is in the ON state not arise, when the electrical voltage V1 is smaller than the electrical voltage V2. One reason is to prevent the charge between sources by which the electrical current flows from the second electrical source 32 to the first electrical source 31 (namely, the first electrical source 31 is charged by the second electrical source 32), wherein the charge between sources arises when the switching state of the switching element S3 is changed while the switching state of the switching element S2 is kept in the ON state under the situation where the electrical voltage V1 is smaller than the electrical voltage V2. However, when the charge between sources is allowed, the switching state of the switching element S3 may be changed while the switching state of the switching element S2 may be kept in the ON state even under the situation where the electrical voltage V1 is smaller than the electrical voltage V2 (see the operating condition in the "L2 CHARGE #2" and the "L2 DISCHARGE #2").

In addition, in the seventh example of the modified example, as illustrated in FIG. 19, the switching state of each of the switching elements S1 and S4 is kept in the OFF state. Therefore, the switching loss of each of the switching elements S1 and S4 is reduced.

(4-2-8) Eighth Example of Modified Operation—the Second Electrical Source 32 is Used, the First Relay R1 is in the ON State and the Vehicle 1 is in the Regeneration State Next, with reference to FIG. 20, an eighth example of the modified operation, in which the electrical power converter 33a operates in the second single operation mode under a situation where the first relay R1 is in the ON state (moreover, the second relay R2 is in the ON state) and the vehicle 1 is in the regeneration state. FIG. 20 is a table which illustrates the switching states of the switching elements S1 to S4 in the eighth example of the modified operation in which the electrical power converter 33a operates in the second single operation mode under the situation where the first relay R1 is in the ON state (moreover, the second relay R2 is in the ON state) and the vehicle 1 is in the regeneration state.

Also in the eighth example of the modified operation, the switching state of one of two switching elements each of which is the upper arm for the second electrical source 32 is changed while the switching state of the other one of two switching elements each of which is the upper arm is kept, as described above.

Specifically, as illustrated in FIG. 20, the switching state of the switching element S4 is changed while the switching state of the switching element S1 is kept in the ON state (see the switching states in the "L2 CHARGE #1" and the "L2 DISCHARGE #1"). The electrical power which is generated by the regeneration is stored in the reactor L1 (namely, the reactor L1 is charged), when the switching element S4 is in the ON state. The electrical power which is stored in the reactor L2 is supplied (namely, the reactor L2 discharges), when the switching element S4 is in the OFF state. Therefore, the switching loss of the switching element S1 is reduced while the electrical power converter 33a functions as the step-down chopper circuit for the second electrical source 32.

However, the operation in which the switching state of the switching element S4 is changed while the switching state of the switching element S1 is kept in the ON state is preferably performed when the electrical voltage V1 is equal to or smaller than the electrical voltage V2 (see an operating condition in the "L2 CHARGE #1" and the "L2 DISCHARGE #1"). In other words, it is preferable that the operation in which the switching state of the switching element S4 is changed while the switching state of the switching element S1 is kept in the ON state not performed when the electrical voltage V1 is larger than the electrical voltage V2. In other words, it is preferable that a situation where the switching elements S1 and S4 are in the ON state and the switching elements S2 and S3 is in the OFF state not arise, when the electrical voltage V1 is larger than the electrical voltage V2. One reason is to prevent the charge between sources by which the electrical current flows from the first electrical source 31 to the second electrical source 32 (namely, the second electrical source 32 is charged by the first electrical source 31), wherein the charge between sources arises when the switching state of the switching element S4 is changed while the switching state of the switching element S1 is kept in the ON state under the situation where the electrical voltage V1 is larger than the electrical voltage V2. However, when the charge between sources is allowed, the switching state of the switching element S4 may be changed while the switching state of the switching element S1 may be kept in the ON state even under the situation where the electrical voltage V1 is larger than the electrical voltage V2 (see the operating condition in the "L2 CHARGE #1" and the "L2 DISCHARGE #1").

On the other hand, as illustrated in FIG. 20, the switching state of the switching element S1 may be changed while the switching state of the switching element S4 may be kept in the ON state, when the electrical voltage V1 is equal to or smaller than the electrical voltage V2, even in the eighth example of the modified operation, as with the fourth example of the modified operation (see the operating condition in the "L2 CHARGE #2" and the "L2 DISCHARGE #2"). Therefore, the switching loss of the switching element S4 is reduced while the electrical power converter 33a functions as the step-down chopper circuit for the second electrical source 32.

On the other hand, it is preferable that the operation in which the switching state of the switching element S1 is changed while the switching state of the switching element S4 is kept in the ON state not be performed, when the electrical voltage V1 is larger than the electrical voltage V2 (see an operating condition in the "L2 CHARGE #2" and the "L2 DISCHARGE #2"). In other words, it is preferable that a situation where the switching elements S1 to S3 are in the OFF state and the switching element S4 is in the ON state not arise, when the electrical voltage V1 is larger than the electrical voltage V2. One reason is to prevent the charge between sources by which the electrical current flows from the first electrical source 31 to the second electrical source 32 (namely, the second electrical source 32 is charged by the first electrical source 31), wherein the charge between sources arises when the switching state of the switching element S1 is changed while the switching state of the switching element S4 is kept in the ON state under the situation where the electrical voltage V1 is larger than the electrical voltage V2. However, when the charge between sources is allowed, the switching state of the switching element S1 may be changed while the switching state of the switching element S4 may be kept in the ON state even under the situation where the electrical voltage V1 is larger than the electrical voltage V2 (see the operating condition in the "L2 CHARGE #2" and the "L2 DISCHARGE #2").

In addition, in the eighth example of the modified example, as illustrated in FIG. 20, the switching state of each of the switching elements S2 and S3 is kept in the OFF state. Therefore, the switching loss of each of the switching elements S2 and S3 is reduced.

In the above described explanation, the electrical power converter 33a which has the first relay R1, the second relay R2, the first filter condenser C1 and the second filter condenser C2 performs the first to eighth example of the modified operation. However, the electrical power converter which does not have at least one of the first relay R1, the second relay R2, the first filter condenser C1 and the second filter condenser C2 may perform at least one of the first to eighth example of the modified operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the scope of the invention. An electrical power converter, which involve such changes, are also intended to be within the technical scope of the present invention.

CROSS-REFERENCE TO RELATED APPLICATIONS

This application is based upon and claims the benefit of priority of the prior Japanese Patent Application No. 2014-055379, file on Mar. 18, 2014, the entire contents of which are incorporated herein by reference. In addition, the entire contents of the above described Patent Literature 1 are incorporated herein by reference.

DESCRIPTION OF REFERENCE CODES 1 vehicle
30 electrical source system
31 first electrical source
32 second electrical source
33 electrical power converter
36 PCU (Power Control Unit)
C smoothing capacitor
L1, L2 reactor
S1, S2, S3, S4 switching element

The invention claimed is:
1. An electrical source system comprising:
a first electricity storage apparatus;
a second electricity storage apparatus;
an electrical power converter having a plurality of switching elements which are electrical connected in series, each of the plurality of switching elements being located in both of a first electrical power conversion path and a second electrical power conversion path, the first electrical conversion path passing through the first electricity storage apparatus and being used to perform an electrical power conversion with the first electricity storage apparatus, the second electrical conversion path passing through the second electricity storage apparatus and being used to perform an electrical power conversion with the second electricity storage apparatus, wherein the plurality of switching elements include a first switching element, a second switching element, a third switching element and a fourth switching element as the plurality of switching elements, the first switching element constitutes an upper arm for the first electricity storage apparatus and an upper arm for the second electricity storage apparatus, the second switching element constitutes the upper arm for the first electricity storage apparatus and a lower arm for the second electricity storage apparatus, the third switching element constitutes a lower arm for the first electricity storage apparatus and the lower arm for the second electricity storage apparatus, the fourth switching element constitutes the lower arm for the first electricity storage apparatus and the upper arm for the second electricity storage apparatus; and a control apparatus which is configured to control an operation of the electrical power converter,
wherein
when the electrical power converter operates in a predetermined mode by which the electrical power converter performs the electrical power conversion with one electricity storage apparatus of the first electricity storage apparatus and the second electricity storage apparatus, the control apparatus controls the electrical power converter to alternately perform a first operation and a second operation,
the first operation changes a switching state of one of at least two switching elements of the plurality of switching elements while keeping a switching state of another one of the at least two switching elements in an ON state,
each of the at least two switching elements constitutes predetermined arm element whose switching state should be changed to perform the electrical power conversion with the one electricity storage apparatus,
the second operation changes the switching state of the another one of at least two switching elements of the plurality of switching elements while keeping the switching state of the one of the at least two switching elements in an ON state,
the predetermined arm element is a lower arm for the one electricity storage apparatus, when an electrical power is outputted from the one electricity storage apparatus, and
the predetermined arm element is an upper arm for the one electricity storage apparatus, when an electrical power is inputted to the one electricity storage apparatus.

2. The electrical source system according to claim 1, wherein
the control apparatus controls the electrical power converter to keep a switching state of at least one switching element of the plurality of switching elements which does not constitute the predetermined arm element in an OFF state.

3. The electrical source system according to claim 2, wherein
the at least one switching element which does not constitute the predetermined arm element is the first switching element, when the one electricity storage apparatus is the first electricity storage apparatus and an electrical power is outputted from the first electricity storage apparatus,
the at least one switching element which does not constitute the predetermined arm element is the fourth switching element, when the one electricity storage apparatus is the first electricity storage apparatus and an electrical power is inputted to the first electricity storage apparatus, the at least one switching element which does not constitute the predetermined arm element is the first switching element, when the one electricity storage apparatus is the second electricity storage apparatus and an electrical power is outputted from the second electricity storage apparatus, the at least one switching element which does not constitute the predetermined arm element is the second switching element, when the one electricity storage apparatus is the second electricity storage apparatus and an electrical power is inputted to the second electricity storage apparatus.

* * * * *